(12) United States Patent
Tan et al.

(10) Patent No.: US 9,976,259 B2
(45) Date of Patent: May 22, 2018

(54) ADHESIVE FORMULATION AND CREPING METHODS USING SAME

(71) Applicant: Buckman Laboratories International, Inc., Memphis, TN (US)

(72) Inventors: Jian Tan, Bartlett, TN (US); Daniel E. Glover, Brighton, TN (US); Rosa Covarrubias, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 0 days. days.

(21) Appl. No.: 14/561,235

(22) Filed: Dec. 5, 2014

(65) Prior Publication Data

US 2015/0159329 A1   Jun. 11, 2015

Related U.S. Application Data

(60) Provisional application No. 61/913,950, filed on Dec. 10, 2013.

(51) Int. Cl.
| | | |
|---|---|---|
| D21H 21/14 | (2006.01) | |
| C09J 103/08 | (2006.01) | |
| D21H 17/00 | (2006.01) | |
| D21H 17/55 | (2006.01) | |
| D21H 17/28 | (2006.01) | |

(52) U.S. Cl.
CPC .......... *D21H 21/146* (2013.01); *C09J 103/08* (2013.01); *D21H 17/28* (2013.01); *D21H 17/55* (2013.01); *D21H 17/72* (2013.01)

(58) Field of Classification Search
CPC ............................. C09J 103/08; D21H 21/146
See application file for complete search history.

(56) References Cited

U.S. PATENT DOCUMENTS

| | | | |
|---|---|---|---|
| 2,926,116 A | | 2/1960 | Keim |
| 3,301,746 A | | 1/1967 | Sanford et al. |
| 3,331,697 A | * | 7/1967 | Salamon ................ C09J 103/08 |
| | | | 106/217.01 |
| 3,640,841 A | | 2/1972 | Winslow et al. |
| 3,652,542 A | * | 3/1972 | Hjermstad et al. ..... C08B 31/12 |
| | | | 524/29 |
| 3,879,257 A | | 4/1975 | Gentile et al. |
| 3,926,716 A | | 12/1975 | Bates |
| 4,063,995 A | | 12/1977 | Grossman |
| 4,094,718 A | | 6/1978 | Czerwin |
| 4,112,222 A | | 9/1978 | Jarowenko |
| 4,300,981 A | | 11/1981 | Carstens |
| 4,304,625 A | | 12/1981 | Grube et al. |
| 4,440,898 A | | 4/1984 | Pomplun et al. |

(Continued)

FOREIGN PATENT DOCUMENTS

| | | |
|---|---|---|
| WO | 9514065 A1 | 5/1995 |
| WO | 9833978 A1 | 8/1998 |

OTHER PUBLICATIONS

Fannon et al. Cereal Chem. 69(4) 456-460, 1992.*

(Continued)

*Primary Examiner* — Liam J Heincer
(74) *Attorney, Agent, or Firm* — Kilyk & Bowersox, P.L.L.C.

(57) ABSTRACT

A formulation useful as a creping adhesive formulation or Yankee dryer coating composition is described. Methods of creping using the formulation are also described.

19 Claims, 9 Drawing Sheets

(56) References Cited

U.S. PATENT DOCUMENTS

| | | | |
|---|---|---|---|
| 4,462,838 A * | 7/1984 | Andres | C09J 103/08 106/145.1 |
| 4,501,640 A | 2/1985 | Soerens | |
| 4,528,316 A | 7/1985 | Soerens | |
| 4,684,439 A | 8/1987 | Soerens | |
| 4,788,243 A | 11/1988 | Soerens | |
| 4,883,564 A | 11/1989 | Chen et al. | |
| 4,886,579 A | 12/1989 | Clark et al. | |
| 4,994,146 A | 2/1991 | Soerens | |
| 5,025,046 A | 6/1991 | Soerens | |
| 5,087,649 A * | 2/1992 | Wegner | C09J 103/08 524/30 |
| 5,179,150 A | 1/1993 | Furman, Jr. et al. | |
| 5,187,219 A | 2/1993 | Furman, Jr. | |
| 5,234,547 A | 8/1993 | Knight et al. | |
| 5,246,544 A | 9/1993 | Hollenberg et al. | |
| 5,281,307 A | 1/1994 | Smigo et al. | |
| 5,326,434 A | 7/1994 | Carevic et al. | |
| 5,370,773 A | 12/1994 | Luu et al. | |
| 5,372,637 A * | 12/1994 | Dwight, Jr. | B29C 33/60 106/2 |
| 5,374,334 A | 12/1994 | Sommese et al. | |
| 5,382,323 A | 1/1995 | Furman, Jr. et al. | |
| 5,437,766 A | 8/1995 | Van Phan et al. | |
| 5,441,562 A * | 8/1995 | Broich | C09J 103/02 106/147.6 |
| 5,468,796 A | 11/1995 | Chen et al. | |
| 5,487,813 A | 1/1996 | Vinson et al. | |
| 5,490,903 A | 2/1996 | Chen et al. | |
| 5,633,309 A | 5/1997 | Warchol et al. | |
| 5,635,028 A | 6/1997 | Vinson et al. | |
| 5,658,374 A | 8/1997 | Glover | |
| 5,660,687 A | 8/1997 | Allen et al. | |
| 5,846,380 A | 12/1998 | Van Phan et al. | |
| 5,853,539 A | 12/1998 | Smith et al. | |
| 5,888,347 A | 3/1999 | Engel et al. | |
| 5,902,862 A | 5/1999 | Allen | |
| 5,942,085 A | 8/1999 | Neal et al. | |
| 5,944,954 A | 8/1999 | Vinson et al. | |
| 5,981,645 A | 11/1999 | Hollenberg et al. | |
| 6,059,928 A | 5/2000 | Van Luu et al. | |
| 6,328,849 B1 | 12/2001 | Dwiggins et al. | |
| 6,365,000 B1 | 4/2002 | Dwiggins et al. | |
| 6,465,047 B1 | 10/2002 | Scott et al. | |
| 6,991,707 B2 | 1/2006 | Hill, Jr. et al. | |
| 7,404,875 B2 | 7/2008 | Clungeon et al. | |
| 7,718,035 B2 | 5/2010 | Boettcher et al. | |
| 7,807,023 B2 | 10/2010 | Dyer et al. | |
| 7,943,705 B2 | 5/2011 | Allen | |
| 8,101,045 B2 | 1/2012 | Furman et al. | |
| 8,357,734 B2 | 1/2013 | Kokko | |
| 8,444,811 B2 | 5/2013 | Dyer et al. | |
| 2003/0084818 A1 * | 5/2003 | Pelley | C09J 103/00 106/206.1 |
| 2003/0154883 A1 * | 8/2003 | MacKey | D01F 9/00 106/215.1 |
| 2005/0161183 A1 * | 7/2005 | Covarrubias | D21H 21/10 162/158 |
| 2006/0157196 A1 * | 7/2006 | Koepnick | C09J 11/04 156/336 |
| 2007/0240823 A1 * | 10/2007 | Alevisopoulos | C09J 103/02 156/336 |
| 2008/0008865 A1 | 1/2008 | Luu et al. | |
| 2009/0306255 A1 * | 12/2009 | Patel | C08J 3/05 524/53 |
| 2010/0155004 A1 * | 6/2010 | Soerens | D21H 17/35 162/111 |
| 2010/0272940 A1 * | 10/2010 | Shi | B29C 45/0001 428/36.92 |
| 2011/0180224 A1 * | 7/2011 | Kozuka | D21H 19/36 162/136 |
| 2011/0271871 A1 | 11/2011 | Hitchcock et al. | |
| 2012/0121873 A1 * | 5/2012 | Mann | C09J 103/00 428/211.1 |
| 2012/0255693 A1 * | 10/2012 | Druecke | D21H 17/29 162/111 |
| 2012/0255696 A1 * | 10/2012 | Ballinger | D21H 17/36 162/164.1 |
| 2012/0289628 A1 * | 11/2012 | Ceulemans | C08L 33/02 524/35 |
| 2013/0048238 A1 | 2/2013 | Glover et al. | |
| 2013/0126113 A1 * | 5/2013 | Tan | D21F 11/00 162/164.3 |
| 2015/0166413 A1 * | 6/2015 | Bastelberger | C08L 31/04 524/5 |

OTHER PUBLICATIONS

Takahashi et al., Acetylated and Hydroxypropylated Wheat Starch: Paste and Gel Properties Compared with Modified Maize and Tapioca Starches, Cereal Chem., 1989, p. 499, vol. 66, No. 6, American Association of Cereal Chemists, Inc.

Garg et al., Effect of propylation on the characteristics of corn starch and variation of properties with different degrees of substitution, Journal of Applied Polymer Science, Feb. 5, 2011, pp. 1383-1892, vol. 119, Issue 3.

"Hydroxyethyl starch", Wikipedia: The Free Encyclopedia. Wikimedia Foundation, Inc., last modified on Sep. 18, 2013, <http://en.wikipedia.org/wiki/Hydroxyethyl_starch>.

International Search Report and Written Opinion issued in corresponding International Patent Application No. PCT/US2014/068676. dated Jun. 1, 2015 (9 pages).

* cited by examiner

ADHESIVE FORMULATION AND CREPING METHODS USING SAME

This application claims the benefit under 35 U.S.C. § 119(e) of prior U.S. Provisional Patent Application No. 61/913,950, filed Dec. 10, 2013, which is incorporated in its entirety by reference herein.

The present invention relates to formulations and, in particular, adhesive formulations, such as creping adhesive formulations or Yankee dryer coating compositions. The present invention further relates to methods for creping that include such formulations and methods to impart tack and release characteristics and/or properties to the creped product.

BACKGROUND OF THE INVENTION

To form a thin paper web from a slurry of water and fiber, the wet web is dewatered, and then the dewatered web is at least partially dried. In the manufacture of tissue and similar paper products, creping is commonly used on such dewatered webs to impart desirable properties, such as softness and bulk. Creping is typically accomplished by conveying or carrying the web on a fabric to a heated rotary drum, sometimes referred to as a Yankee dryer. The web commonly is transferred to an adhesive dryer surface of the dryer and carried around a major circumferential portion of the dryer before the web reaches a zone of web de-contact from the drum. The de-contact zone is equipped with a creping blade against which the web abuts so as to be pushed backwardly or compacted upon itself in a machine direction of the web and attain the well-known tissue crepe paper structure, at which point the resulting creped web is removed from the dryer and collected, usually in rolled up form.

Before the web is transferred to the Yankee dryer, typically an adhesive composition, sometimes referred to as a "coating package" in the industry, is applied directly to the dryer surface of the dryer to form the adhesive dryer surface. The creping action typically requires some adhesion of the web to the outer surface of the dryer to effect a consistent and uniform creping action. Creping adhesives alone or in combination with release agents or other adjuvants have been applied either to the web or to the surface of the dryer in efforts to provide some balance of adhesion and release between the web and the dryer surface for purposes of drying and creping.

Various properties of the creping adhesive can be factors in the creping performance obtained. The level of adhesion of the creping adhesive to the drum dryer surface can be another factor which affects creping performance and results. Inadequate adhesion can result in poor creping, sheet floating, poor sheet handling, or other problems, whereas excessive adhesion may result in crepe blade picking, web plugging behind the crepe blade, web breaks due to excessive tension, or other problems.

Various types of creping adhesives have been used to adhere fibrous webs to rotary dryers such as Yankee dryers. Natural (unmodified) starch has been used in the past, which has been replaced by other chemistries over the years for many reasons. Natural starch cannot reach a high solid content with acceptable viscosity after cooking. Natural starch needs on-site cooking equipment and the equipment is expensive and needs significant maintenance work, such as runability and bacteria issues. Cooked natural starch contains tiny gel balls that make it hard to spray the material onto a Yankee surface and difficult to form a uniform film. Further, natural starch has limited Yankee protection ability and bonding strength. In place of natural starch, creping adhesives have included, for example, polyvinyl acetate-ethylene copolymer emulsions and aqueous polyvinyl alcohol solutions. It has been found that conventionally used polyvinyl acetate-ethylene copolymer compositions, which may contain small percentages of polyvinyl alcohol such as less than about 5% of the total solids by weight, may be generally adequate for the purpose but can cause a number of undesirable effects, such as blocking problems and others as mentioned in U.S. Pat. No. 6,991,707 B2, which is incorporated herein by reference in its entirety. Polyvinyl alcohol compositions (which may contain some polyvinyl acetate) can pose similar problems when used as creping adhesives, and can tend to coat the dryer with a hard and uneven film that builds up as drying and creping proceed, resulting in uneven creping or other problems.

Other creping adhesives have included wet strength resins, such as polyamide epichlorohydrin (PAE), poly(amido-amine) epichlorohydrin (PAAE), and polyethyleneimine (PEI). PAE and PAAE resins are described, for example, in U.S. Pat. Nos. 2,926,116; 7,404,875 B2; 7,943,705 B2; and 7,718,035 B2. PAAE based, wet strength resin or "WSR," are not green materials. The product and by-products of the PAAE resins usually are not food grade, biodegradable, or renewable. For wet strength resin based Yankee coating chemistries, the performance of PAAE resins alone may not be good enough. For PEI based resins, the product cost is highly impacted by raw material costs.

There also is a need for coating formulations that are versatile enough to be used on conventional Yankee rolls, as well as with TAD fabrics and other modes of operation used for drying and creping wet tissue webs. In a typical through-air drying (TAD) operation, for instance, a web formed from a slurry of water and fiber is dewatered without significantly mechanically pressing the wet web, such as by vacuum drying. This is followed by a drying action using a hot air blast. The resulting webs can be transferred to a surface of a Yankee dryer for creping using a knuckled fabric so that the web adheres to the dryer in closely spaced zones, with bulking of the web between the zones. Alternatively, many desirable properties of creped tissue can be imparted without Yankee creping. For instance, a wet tissue web can be foreshortened while still moist in a process referred to as rush transfer, which can be used as part of a TAD operation without use of a Yankee drum. As shown for example in U.S. Pat. No. 5,888,347, a wet tissue web can be transferred from a forming section wire to a second slower-moving transfer fabric under carefully controlled conditions to foreshorten a moist paper web before it is transferred to a TAD fabric and through-dried to final dryness. The transferred moist tissue web can be placed on a TAD fabric that has a three-dimensional structure, after which hot air can be passed through the web to dry the web in a morphology corresponding to that of the TAD fabric, producing a web that can have improved softness without use of Yankee drying/creping.

Improved coating formulations are needed for tissue drying and creping processes (or other foreshortening processes), which can be sourced from high solid content, high temperature resistant and more environmentally-friendly adhesives that can provide an improved tack profile with respect to moisture content or other properties of the tissue web during pre-creping drying of the tissue and reduce coating costs with improved performance or without loss of performance.

SUMMARY OF THE PRESENT INVENTION

It is a feature of the present invention to provide improved adhesive formulations and concentrates useful in preparing them.

A further feature of the present invention is to provide a high solid content, high temperature resistant, and/or storage stable formulation based on a modified starch, which can be diluted for end-use by itself or as a co-additive with other components in coating adhesives, such as Yankee coating chemistries.

An additional feature of the present invention is to provide an environmentally-greener creping adhesive formulation that comprises a sustainable, biodegradable, and safe modified starch that can be used alone or in combination with other adhesive coating chemistries.

A further feature of the present invention is to use a modified starch for partial or full replacement of conventional active adhesive components used in Yankee coatings or through-air drying (TAD) Yankee coatings, which can reduce coating costs with improved performance or without loss of performance.

An additional feature of the present invention is to provide a creping adhesive formulation that has an improved tack profile performance, wherein the adhesive can impart high initial (wet) tack with tissue webs undergoing drying in the formation of a creped product on a Yankee dryer and reduced tack to release the dried web at a creping blade.

A further feature of the present invention is to provide an adhesive formulation that can be used in through-air modes of operation of paper making that can be used in forming a creped web product.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

One or more of the foregoing features have been accomplished in accordance with this invention by providing an adhesive formulation containing a) at least one alkoxylated starch, b) at least one of i) at least one resin, and/or ii) at least one release aid, and/or iii) at least one modifier, and optionally c) water, wherein the resin is different from a). The water present in the adhesive formulation is optional, and the water content can be adjusted to provide concentrate or dilute forms of the adhesive formulation. As an option, the alkoxylated starch and at least two, or at least three, or all of the resin, release aid, modifier, and water are present in the adhesive formulation.

The present invention further relates to a process of creping that includes the use of the adhesive formulation of the present invention. For instance, the process for creping a fiber web can comprise providing a rotating cylindrical dryer or similar roller, including a dryer surface. A creping adhesive formulation comprising the indicated formulation is applied to the dryer surface, and a fiber web is conveyed to the dryer surface. The fiber web is dried on the dryer surface to form a dried fiber web, and the dried fiber web is creped from the dryer surface. As an option, the fiber web to creped can be through-air dried before transfer to a Yankee dryer surface that has been pre-coated with the adhesive formulation. The adhesive formulation of the present invention can be used in other applications in the paper industry or other industries, such as a TAD fabric coating in through-air drying processes.

The present invention further relates to a process of creping that includes the use of the adhesive formulation of the present invention which comprises through-air drying without use of a Yankee dryer. A process of making a creped fiber web can comprise applying a formulation comprising the adhesive formulation to a TAD fabric to provide a coated surface. The TAD fabric can be arranged in an endless loop such that the TAD fabric passes around a foraminous dryer roll of a through-air dryer (TAD). A fiber web can be transferred to the coated surface of the TAD fabric, and the coated TAD fabric with the fiber web can be carried thereon around the dryer roll with passing of heated air through the fiber web to provide a dried web without drying of the fiber web on a Yankee dryer. The dried web can be separated from the TAD fabric for collection of the dried web, wherein the dried web comprises at least one creped property.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

Figure 1:
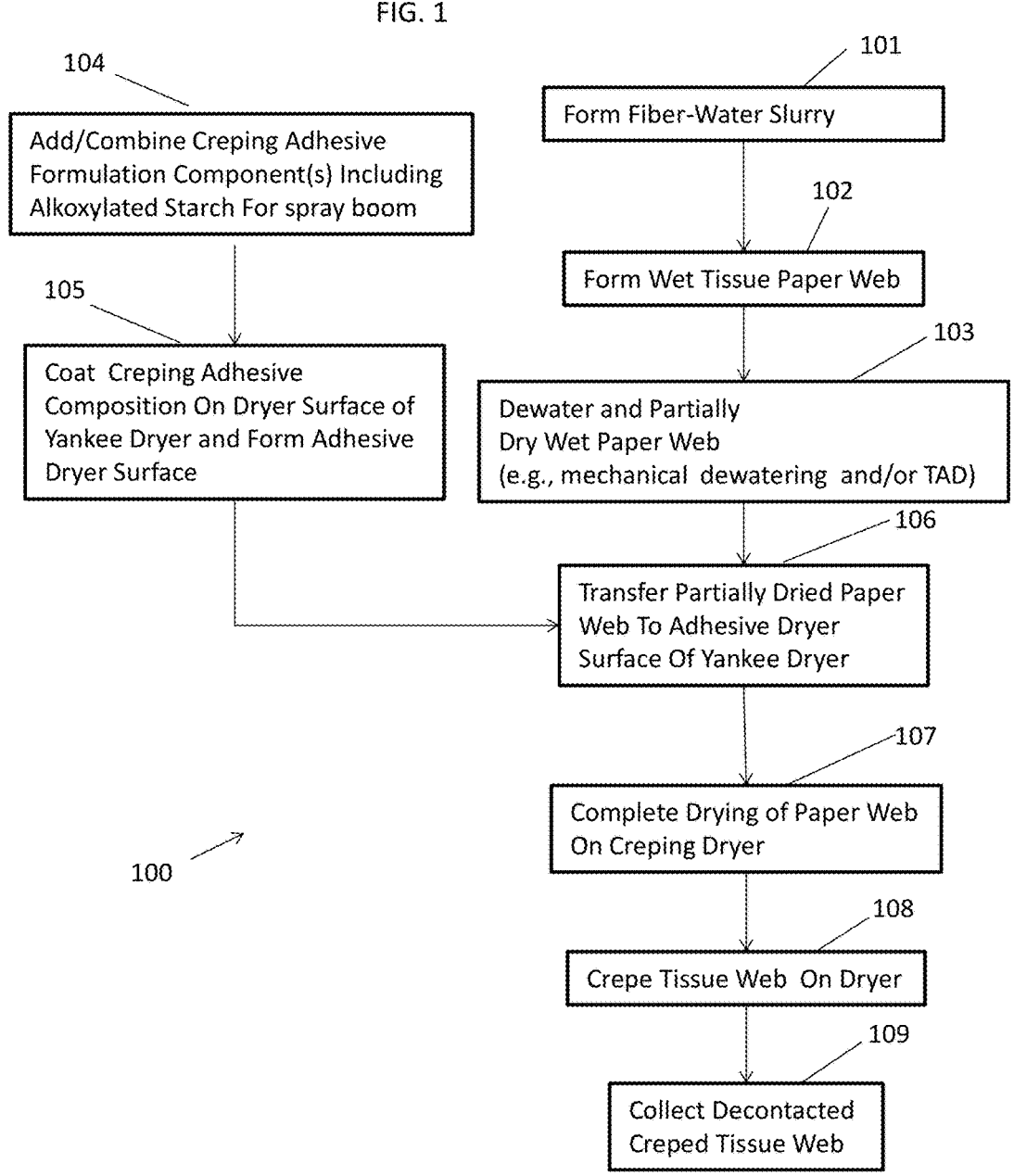
FIG. 1 is a process flow chart illustrating a process according to the present invention.

The present invention relates to adhesive formulations, such as creping adhesive formulations or Yankee dryer coating compositions or a through-air drying (TAD) fabric coating. The adhesive formulations can provide tack and release characteristics to a fiber web, when the fiber web is on the Yankee dryer or dryer surface. The formulations of the present invention can be useful as TAD fabric tack and release aids. The adhesive formulations contain a modified starch that is at least one alkoxylated starch, and at least one of i) at least one resin, and/or ii) at least one release aid, and/or iii) at least one modifier, and, optionally, water. The alkoxylated starch and at least two, or at least three, or all of the resin, release aid, modifier, and water are present in the adhesive formulation. The alkoxylated starch can be formulated in storage stable, high solid content concentrates for transport and pre-use storage, and diluted on-site before use. The alkoxylated starch can be used as the sole adhesive or as a co-additive with other resins and/or other components in Yankee coating adhesive chemistries, TAD fabric coatings, release coatings, or other paper making coatings.

The adhesive formulation can be used as a creping adhesive. One type of creping is with a traditional Yankee roll or metal roller where coatings are applied onto a rotatable cylindrical drum and then the tissue to be creped is placed on the drum for drying before creping and collection of the dried creped web off the drum. A second type of creping can comprise through-air drying (TAD). In TAD, a wet fiber web that can be creped or foreshortened is through-air dried with a hot air blast instead of mechanically pressing for dewatering. A TAD fabric can be used to carry the wet tissue web through one or more hot air dryers and impress a structured three-dimensional surface pattern into the wet web. A TAD can be coated with an adhesive/release formulation containing the alkoxylated starch before the wet web is transferred onto the TAD fabric for TAD processing.

The alkoxylated starch can be used to partially or fully replace amounts used for resins in Yankee adhesive coating applications or TAD Yankee coatings. The alkoxylated starches of the present invention can replace 0.1 wt % to 100 wt % of the resin(s) in an adhesive formulation, such as from 0.5 wt % to 99 wt %, 1 wt % to 99 wt %, 5 wt % to 90 wt %, 10 wt % to 80 wt %, 20 wt % to 70 wt %, 30 wt % to 50 wt % and the like. The partial or full replacement of the usual Yankee or TAD fabric coating resins by the alkoxylated starch in the adhesive formulations can reduce coating costs, improve performance, or both. As an option, the alkoxylated starch can be used as a co-additive and partial replacement for a wet strength resin in a Yankee adhesive coating. As an option, the alkoxylated starch can be used as a partial or full replacement for a PAAE wet strength resin. The alkoxylated starch can be used to replace at least part of PAAE in a Yankee roller creping method. The alkoxylated starch component can have synergy with Yankee coating chemistries using wet strength resins, such as PAAE-based Yankee coating chemistries or others. As an option, the alkoxylated starch can be used to partially or fully replace PVOH in a TAD Yankee coating or other adhesive coatings. PVOH can be used in combination with the alkoxylated starch component of the adhesive resin. The PVOH can be used to build up a sufficient coating. The alkoxylated starch can be a replacement, partial or full, for this PVOH.

The alkoxylated starch component present in the adhesive formulations of the present invention is a modified starch that has unique properties compared to natural starch and currently used Yankee coating chemistries, such as PVOH, PAAE, and others. No on-site cooking equipment or make-down equipment is necessary for use of formulations containing the alkoxylated starch. The alkoxylated starch can be a sustainable, biodegradable, safe, and cost-effective as natural starch without the above-indicated drawbacks of natural starch. The alkoxylated starch, and optionally some or all of any other components, of the adhesive formulation can be biodegradable and/or food grade, and/or can be entirely or primarily (over 50 wt %, over 75 wt %, over 90 wt %) biodegradable and/or food grade. With the alkoxylated starch of the present invention, a very high solid content liquid starch product can be obtained with acceptable (pumpable) viscosity. The "liquid" property refers to the form of the material at about 25° C. and atmospheric pressure. High solid content concentrates of the alkoxylated starch can have good storage stability. Further, the alkoxylated starch has good water-dispersability and sprayability.

The alkoxylated starch adhesive component can have high temperature resistance and high tack at high temperature. The formulations comprising alkoxylated starch of the present invention can tolerate exposure to high process temperatures, such as from about 100° C. to about 180° C., or from about 110° C. to about 170° C., or from about 120° C. to about 160° C., or other temperatures which may be experienced by coated webs during Yankee drying, TAD, or other paper making processes. In these temperature ranges and during the run or dwell times that apply, the alkoxylated starch component and the formulation containing it can be stable from the standpoint that the component does not degrade with regard to its chemistry.

Figure 7:
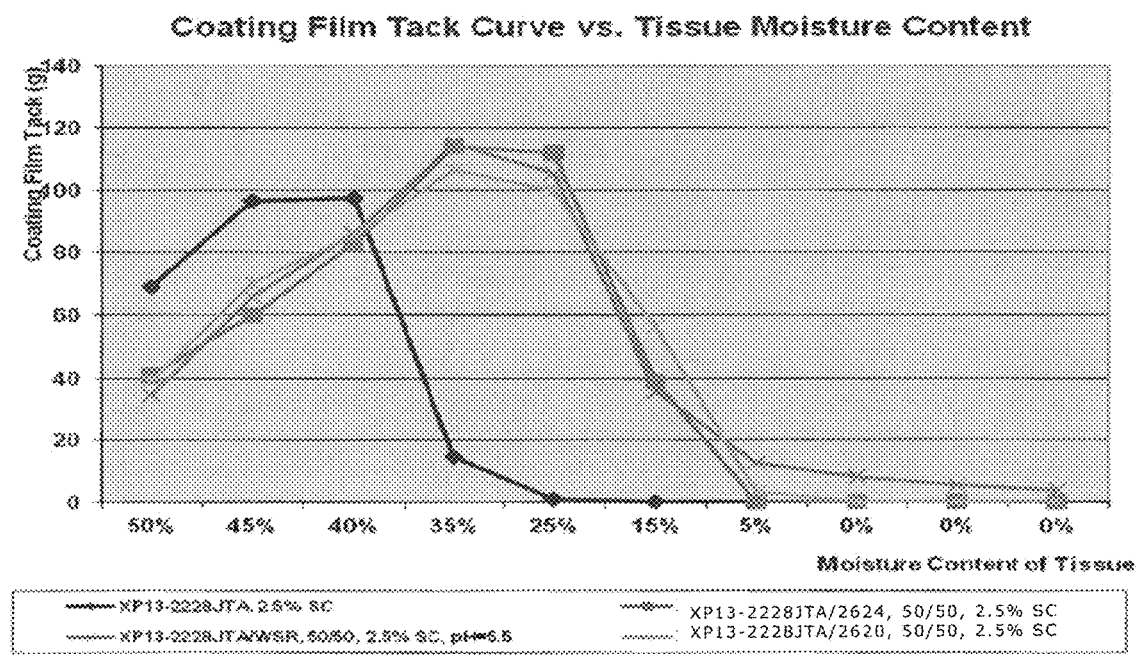
FIG. 7 is a graph plotting the coating film tack (g) with respect to tissue moisture content of a fiber web contacted with an adhesive formulation using alkoxylated starch as the only adhesive or in combinations with a wet strength resin or other different resins according to the present invention.
Figure 8:
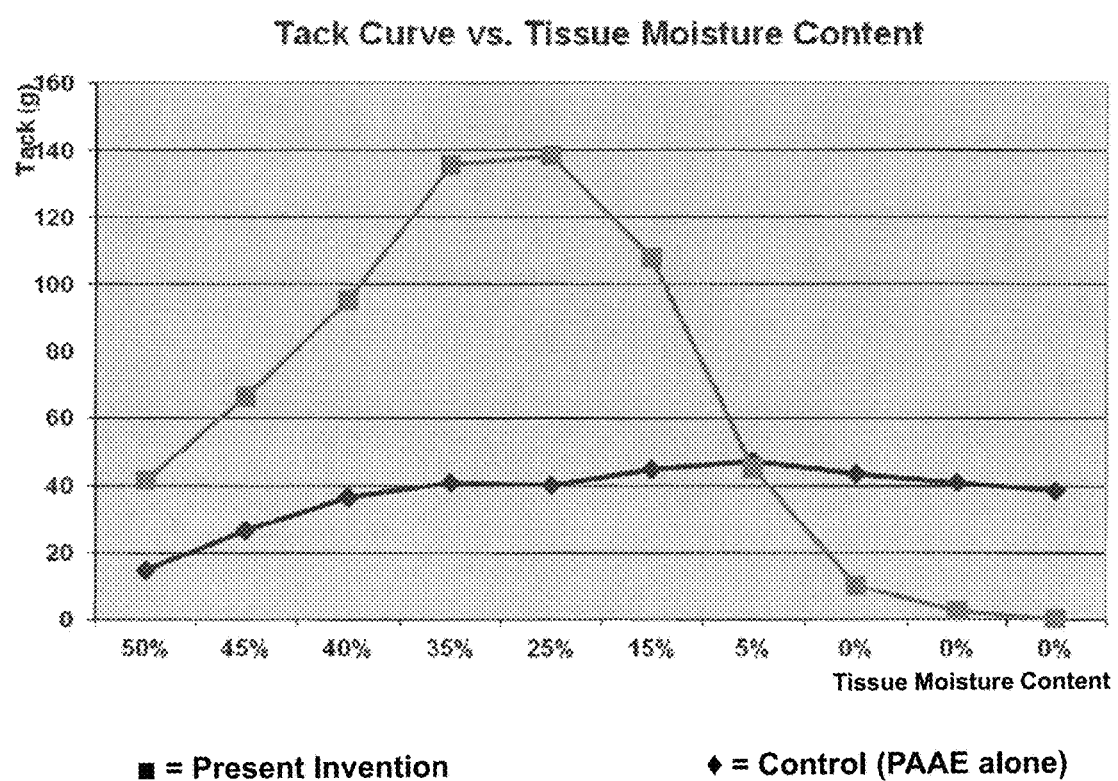
FIG. 8 is a graph plotting the coating film tack (g) with respect to tissue moisture content of a fiber web contacted with an adhesive formulation using alkoxylated starch in combination with a wet strength resin according to the present invention, and a comparative formulation as a control which uses a conventional wet strength resin only as adhesive.
Figure 9:
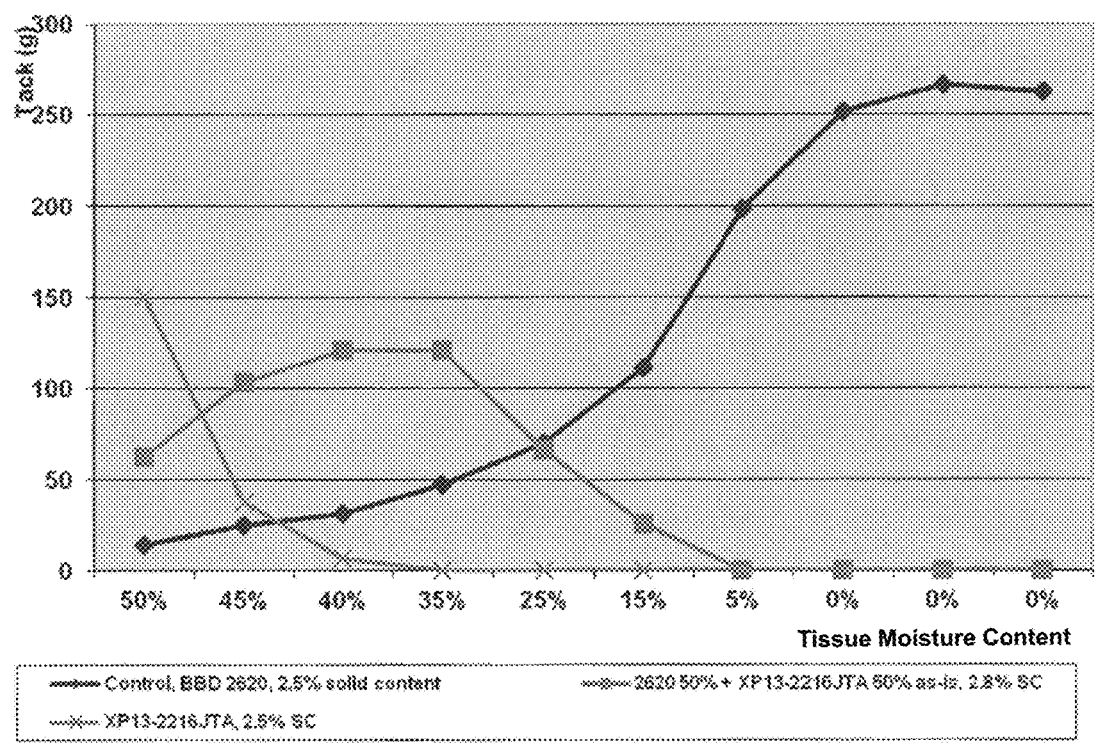
FIG. 9 is a graph plotting the coating film tack (g) with respect to tissue moisture content of a fiber web contacted with an adhesive formulation using alkoxylated starch as the only adhesive or in combination with a different resin according to the present invention, and a comparative formulation as a control which uses the wet strength resin only as adhesive.

Adhesive formulations of the present invention which contain the alkoxylated starch can provide an improved tack profile performance, wherein the adhesive can impart high initial (wet) tack with tissue webs undergoing drying in the formation of a creped product on a Yankee dryer and reduced tack to release the web at a creping blade. The formulations have initial high wet tackiness and high release, low tackiness when dried, such as shown by test results in the examples included in the present application. The coating film tack of the formulation can increase by at least 1.5 times (1.5×), or at least 1.6 times, or at least 1.7 times, or at least 1.8 times, or at least 1.9 times, or at least 2 times, or from 1.5 to 2 times, when moisture content of a fiber web that is conveyed around a roller surface of a Yankee drum with an intervening coating of the formulation decreases from about 50 wt % to about 30 wt % during drying of a fiber web on a dryer surface of a Yankee drum, and then can decrease by at least 1.5 times (1.5×), or at least 1.6 times, or at least 1.7 times, or at least 1.8 times, or at least 1.9 times, or at least 2 times, or from 1.5 to 2 times, when moisture content of the fiber web decreases from about 30 wt % to about 10 wt % during the drying of the fiber web on the dryer surface. The formulation is water dispersible, which means that it is highly dispersible in water and/or it is water soluble. Conventional resins, like PAAE, are very difficult to disperse and, therefore, this is an advantage of using some or all of the modified starch versus the conventional resins. Synergistic results can be obtained with the formulation by combining the alkoxylated starch with a conventional resin, such as PAAE. As shown by comparative testing results included in the examples herein, such combinations of alkoxylated starch and a different resin can display a broader range of effectiveness with regard to tackiness at different moisture levels. An objective for these formulations is to have tackiness, especially when the moisture content is high, which is when it is most susceptible to not staying on the roller, and as the tissue or paper dries, reduction in tackiness is desired because, at that point, the paper is drying and its release off the roller is desired. In view of these considerations, there can be a "sweet spot" with regard to when tackiness is wanted and when it is not. As shown in the graphs of FIGS. 7, 8, and 9 of the present application, such a "sweet spot" can be achieved, especially when the moisture content is high, with formulations of the present invention.

The alkoxylated starches can be formulated as stable, homogenous dispersions that are readily soluble and/or dispersible in water. The alkoxylated starches can be formulated alone or in combination with one or more different additives. The alkoxylated starches can be formulated in high solids compositions or concentrates, which can be diluted for use. Co-additives, such as indicated herein, can be included with the alkoxylated starch in the concentrate, or can be combined later with the alkoxylated starch in the concentrate when formulated for use, or some co-additives can be included in the concentrate and others added to a dilute end-use formulation. High solids compositions containing the alkoxylated starches can be more conveniently and efficiently transported with less bulk, yet stored in a stable manner. A ready-to-use dilute adhesive formulation that contains the alkoxylated starches can be formed by dilution, such as by aqueous dilution, of a high solids concentrate thereof before use of the resulting diluted formulation, such as a creping adhesive on a Yankee drum or as a TAD fabric coating.

The solids content (SC) of a concentrate formulation of the present invention can contain up to 60% by weight of the formulation, such as from about 20% to about 60% by weight, or from about 25% to about 60% by weight, or from about 30% to about 60% by weight, or from about 35% to about 55% by weight, or other amounts. As indicated, the concentrate can contain alkoxylated starch alone or in combination with other ingredients. A highly-concentrated product reduces bulk for shipping and storage. An end-user of the concentrated product, such as a paper company or other user, can dilute the concentrate to a desired solids content for the application. For example, the concentrate can be diluted, such as with water or other fluid carriers in which the solids can be dispersed or dissolved, to provide a solids content greater than zero and below 20 wt %, or below 10 wt %, or below 5 wt %, or below 3 wt %, or below 2 wt %, or below 1 wt %, or from 1 wt % to 20 wt %, or from 1 wt % to 10 wt %, or from 1 wt % to 5 wt %, or from 2 wt % to 5 wt %, or other amounts. Examples of amounts for specific uses such as paper creping, are included herein.

The alkoxylated starch can be a $C_1$ to $C_{10}$ alkoxylated starch (e.g. $C_1$, $C_2$, $C_3$, $C_4$, $C_5$, $C_6$, $C_7$, $C_8$, $C_9$ or $C_{10}$), such as an ethoxylated starch, propoxylated starch, and the like. The alkoxylated starch can be a nonionic alkoxylated starch or an ionic alkoxylated starch. The alkoxylated starch also may be referred to herein as a "hydroxyl alkylated starch." A nonionic alkoxylated starch can be used that has a high wet (initial) tack, which is similar or can exceed the performance of conventional wet strength resins such as PAAE, or polyvinyl alcohol (PVOH) adhesives, used for Yankee coating chemistries. The nonionic alkoxylated starch can be synthesized or obtained commercially. The nonionic alkoxylated starch can be FDA approved material, such as a food grade material. Nonionic alkoxylated starch can be commercially obtained, such as under the product name of PEN-LAM-HT®, from Penford Products Co. Ionic alkoxylated starch can be synthesized or obtained commercially. This modified starch can have good wash-out resistance and good rewettability. It can be used alone as a Yankee coating adhesive or combined with other Yankee coating chemistry as additive with good synergy. A cationic alkoxylated starch can be used which has very good wet (initial) tack and has wide tack window at high moisture content, and which can be substituted in part or entirely for conventional Yankee coating applications. It also can be a FDA approved material, such as a food grade material. A source of high cationic charge modified starch which can be used is commercially available under the product name TOPCAT® L95, from Penford Products Co.

The alkoxylated starch component can be prepared by alkoxylation reactions applied to a base or raw starch. Alkoxylation of a starch is a process that reacts lower molecular weight epoxides (oxiranes), such as ethylene oxide, propylene oxide, butylene oxide, or others, with a starch. These epoxides are capable of reacting with a hydroxyl group (or multiple different hydroxyl groups) of the starch generally under alkaline (basic pH) catalysis, causing a ring opening and the addition of an oxyalkylene group at the hydroxyl group. As shown in the chemical reaction (I) shown below, alkoxylation of a starch results in a hydroxyl group present on the terminal end of the molecule, and a varied number of moles of alkylene oxide can be added. Therefore, the reaction of ethylene oxide is ethoxylation, the reaction of propylene oxide is propoxylation, and so forth.

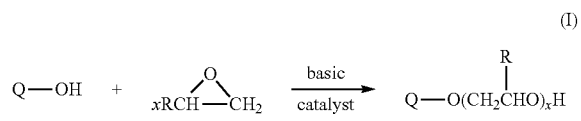

(I)

where Q is a starch structure including the at least one hydroxyl group, x is a positive nonzero value (e.g., at least 1, or 1 to 6, or from 2 to 4), and R can be hydrogen or an alkylene group, such as C1-C8 alkylene group (e.g., $CH_3$—, $CH_3CH_2$—, $CH_3CH_2CH_2$—, $CH_3CH_2CH_2CH_2$—, $CH_3CH_2CH_2CH_2CH_2$—, $CH_3CH_2CH_2CH_2CH_2CH_2$—, $CH_3CH_2CH_2CH_2CH_2CH_2CH_2$—, or $CH_3CH_2CH_2CH_2CH_2CH_2CH_2CH_2$—).

Alkoxylated starch can be prepared in this manner by reacting starch with an aliphatic alkylene oxide having from one to ten carbon atoms, such as two to five carbon atoms, or two to three carbon atoms, or any combinations of C1-C10 alkylene oxides. The base molecule of the starch (Q) can have one hydroxyl group or a plurality of hydroxyl groups which can be reaction sites for the indicated alkoxylation reaction. A single hydroxyl group on Q is shown in reaction (I) to simplify the illustration. For making the alkoxylated starch, the addition of an alkylene oxide, such as propylene oxide can be at an amount of from about 0.03 to 0.5 mol per mole of starch, such as an addition at 0.05 to 0.30 mole alkylene oxide to mole of starch, or from 0.08 to 0.2 mole alkylene oxide to mole of starch.

As indicated in reaction (I), the reaction can go to completion and the value of "x" for the alkylene oxide reactant can be carried over into the product material. With respect to "Q-OH" in reaction (I), the type of starch is not particularly limited. According to the present invention any starch type, whether native or converted, may be used as the base starch for preparing the alkoxylated starch products, provided it contains reactive hydrogen in at least one hydroxyl group. Such starches include those derived from any plant source, for example, corn, potato, sweet potato, rice, sago, tapioca, waxy maize, sorghum, wheat and high amylose corn. Also included among the suitable starches are the various starch derivatives such as ethers, esters and thin-boiling types made by known processes comprising, for example, acid treatments, and oxidative, enzymatic or thermal degradations. Other starches useful in the method are the starch dextrins, fractions such as amylose or amylopectin and other depolymerized starch products, and those starches inhibited with polyfunctional reagents such as epichlorohydrin, phosphorus oxychloride, acrolein, and the like.

As an option, the alkoxylation method can comprise the steps and materials such as shown in U.S. Pat. No. 4,112,222, which is incorporated herein by reference in its entirety. In this method option, alkoxylated starch can be prepared by reacting a granular starch base with a C1-C10 alkylene oxide, such as ethylene oxide and/or propylene oxide, in the presence of an alkali metal acetate or another water-soluble salt of a selected carboxylic acid. The alkoxylation method can involve reacting a granular starch base having a moisture content of about 5-25% based on the weight of the starch with about 10-60% alkylene oxide by weight (e.g., 10-60% or 15-40% or 20-30% by weight ethylene oxide and/or propylene oxide), and the reaction can be carried out for about 4.5-24 hours at a temperature of about 70° C.-100° C., and a pressure of about 10-100 p.s.i.g., and then recovering the modified starch product after completion of the reaction.

As indicated, in addition to the alkoxylated starch, the formulations of the present invention can contain, as mentioned, water (e.g., as diluent), at least one different resin, a release aid, a modifier, or any combinations thereof. The alkoxylated starch can be essentially used as a tack or tacky agent so that there is enough tackiness on a dryer roller to hold the tissue being creped. A balance is desirable with these adhesive formulations. As indicated, on one hand, enough tackiness is desired to hold the tissue on the dryer roller so that it can be creped, and, yet, enough release at the appropriate time is also desired so that the web comes off the roller at the creping blade without problems. Thus, a combination of initial (wet) tacky adhesive and delayed release qualities can be desirable, especially as a function of the moisture content of the web being dried. For example, it can be desirable to provide high initial (wet) tack immediately after a wet web is transferred to a dryer roller, and after the web is substantially dried and near a creping blade or other separation device blade the formulation shows more release property and less tackiness. The adhesive formulations of the present invention can provide such a tack profile.

The resins that can be used in combination with the alkoxylated starch in adhesive formulations can include at least one crosslinkable polymer in combination therewith. Crosslinkable polymers useful in the present invention can include, for example, crosslinkable natural polymers, crosslinkable synthetic polymers, crosslinkable thermoplastic polymers, or thermosetting polymers, or any combinations thereof. The crosslinkable polymers can be, for example, homopolymers, copolymers, block copolymers, multi-stage polymers, star polymers, or any combinations thereof. Non-limiting examples of polymer chemistries include, but are not limited to, ethylene vinyl acetate polymers, acrylic homopolymers and copolymers, vinyl acetate homopolymers, polyamides, polyvinyl alcohols, starches, cellulosics, poly(aminoamide)-epichlorohydrins (PAAEs), polyamide epichlorohydrin polymers, polyethyleneimine polymers, ionene polymers, polymeric quaternary ammonium compounds (polyquats), or other polymers, or any combinations thereof. The polymer can be functionalized to provide crosslinking functionality. Other crosslinkable polymers which may be used include those mentioned, for example, in U.S. Pat. No. 5,246,544, which is incorporated herein by reference in its entirety.

Polyvinyl alcohols and wet strength resins that are PAAE-based are two preferred categories of crosslinkable resin which can be used. Polymers which can be used include, for example, BUBOND® series modified PAAE products, such as BUBOND® 2620, BUBOND® 2624, sold by Buckman Laboratories International Inc., Memphis, Term. USA. Crosslinkable or partially crosslinked, partially crosslinkable PAAE type resins may be used. PAAE resins synthesized with a small excess of epihalohydrin with the extent of crosslinking controlled to terminate by the addition of acid before reaching completion can be used, such as mentioned in U.S. Pat. No. 7,718,035 B2, which is incorporated herein by reference in its entirety. CREPETROL® 5318, for example, a commercial PAAE creping adhesive sold by Hercules Incorporated, can be used. Partially or lightly crosslinked ionene polymers or polymeric quaternary ammonium compounds (polyquats) may be used, such as mentioned in U.S. Pat. No. 6,991,707 B2, which is incorporated herein by reference in its entirety. A second or more optional polymer which can be used with the crosslinkable polymer can be, for example, a wet strength or hard cationic resin or polymer that is non-crosslinkable or crosslinkable. Another type of optional polymer which may be used can be a soft polymer which has a lot of tack, which may assist edge control at high running speeds. A non-limiting commercial example of such a soft, yet tacky resin is PROSOFT® TC9700, an EPI-crosslinked poly(aminoamide), sold by Hercules Incorporated.

As indicated, the alkoxylated starch can be used in an adhesive coating application, such as creping, as a full replacement or partial replacement for a tacky component, such as polyvinyl alcohol (PVOH), or it can be partial or total replacement for a resin, such as a PAE resin or PAAE base resin or both. The combination weight ratio of alkoxylated starch to a different resin, such as PAAE or PVOH or other resin, used in an adhesive formulation of the present invention can be from a 10:1 to 1:10, or 7.5:1 to 1:7.5, or 5:1 to 1:5, or 2.5:1 to 1:2.5, or 1.5:1 to 1:1.5, or 1.25:1 to 1:1.25, or 1.1:1 to 1.1:1, or 1.05:1 to 1:1.05, or 1:1, or other weight ratios, based on weight percentages of the respective components. When the alkoxylated starch is used with a conventional resin, such as PAAE, polyvinyl alcohol, or other resin, the two can be mixed together prior to shipping to an end user, such as a paper manufacturer, or the different components can mixed on site where used. When used on a Yankee drum, both components can be sprayed separately onto the roller, but it is preferred that both are mixed together prior to spraying on the roller.

The release aid, if used, can be in a high solids concentrate form or dilute aqueous form when combined with the alkoxylated resin. The release aid, like the alkoxylated starches, can be transported and stored in a high solids concentrate form and diluted before or when combined with the alkoxylated starch. Both of these components, and others, may be included in a single high solids concentrate, which can be further diluted at the time of use.

The release aid can be an oil-based release formulation contains at least one natural oil, such as at least one vegetable oil, at least one lecithin, and at least one dispersant/emulsifier, and, optionally, water. The vegetable oil(s), by weight percent, can be the highest weight percent component present in the oil-based release formulation. The water, out of all of the components that form the release aid, can be the lowest, by weight percent, component present in the release aid.

The at least one natural oil can be or include one vegetable oil, a combination of two, three, four, or more different types of vegetable oils. The amount of the natural oil present in the release aid can be over 50% by weight, based on the total weight of the release aid, such as 50-75 wt %, 55-75 wt %, 60-75 wt %, 65-75 wt %, 70-75 wt %, 55-65 wt %, or other amounts within these ranges. Examples of the natural oil include, but are not limited to, vegetable oils, such as soybean oil, canola oil, corn oil, palm cornel oil, coconut oil, rape seed oil, sunflower oil (sunflower seed oil), peanut oil, olive oil, triglycerides (such as from a renewable resource), or any combinations thereof.

The lecithin can be natural or can be modified by hydroxylation or acetylation or otherwise modified. Lecithin is sold commercially by Solae. Solec HR lecithin can be used. The lecithin can be or include soy lecithin or sunflower lecithin or any combinations thereof. The lecithin can be a combination of two or more different types of lecithin. The lecithin can be present in the release aid in an amount (based on the total weight percent of the release aid, i.e., the oil-based release formulation) of from 10 wt % to 30 wt %, 15 wt % to 30 wt %, 20 wt % to 30 wt %, 25 wt % to 30 wt %, 15 wt % to 25 wt %, or other amounts within these ranges.

With regard to the dispersant/emulsifier, at least one dispersant/emulsifier can be present, such as at least two dispersants/emulsifiers or at least three dispersants/emulsifiers. The dispersant/emulsifier can be or include an alkoxylated castor oil ester, one or more polysorbates (such as a sorbitan oleate or sorbitan monolaurate), an alkoxylated alcohol, such as an ethoxylated alcohol (e.g., TOMADOL alkoxylated alcohols from Air Products, for instance, TOMADOL 1-5, 1-7, 1-73B, 1-9, or 25-3, or from Harcros). With regard to the alkoxylated alcohol, such as an ethoxylated alcohol, the molecular weight (average) can be, for instance, from about 300 MW to about 1,000 MW, such as 400 to 750 MW, 400 to 600 MW, and the like. The alkoxylated alcohol can be linear or branched. The EO groups (average) can be from 3 to 12 or 3 to 11, such as from 3 to 9. The EO content (weight percent) can be from 30 wt % to 75 wt %, such as from 40 wt % to 70 wt %, 50 wt % to 70 wt %. The HLB can be from 7 to 15, such as 8 to 14, or 10 to 14. The alkoxylated alcohol can have 3-6 moles of ethylene oxide and/or 3 to 12 carbon atoms.

The alkoxylated castor oil ester can be an ethoxylated castor oil ester, such as a T-Det C-40, available from Harcros. The alkoxylated castor oil, such as an ethoxylated castor oil ester, can have from 20 to 60 moles of EO, such as from 30 to 50 moles, or 40 to 50 moles, and the like. The alkoxylated castor oil ester, such as the ethoxylated castor oil ester, can have a fatty acid end carbon number, such as from 10 to 20, 12 to 18, or 15 to 16.

The polysorbate can be at least one polysorbate, at least two, or at least three. The polysorbate can be Polysorbate 20, Polysorbate 40, Polysorbate 60, and/or Polysorbate 80. The polysorbates can have 20 oxyethylene groups in the molecule. More specific examples are provided below.

With regard to the sorbitan oleate (a.k.a., sorbitan mono oleate), one example can be SPAN 80. The sorbitan oleate can be a sorbitan (Z)-mono-9-octadecenoate. The sorbitan oleate can be a SPAN 20, SPAN 40, SPAN 60, and/or SPAN 80.

With regard to the sorbitan monolaurate, commercial sources include Ivanhoe and Lambent.

With regard to the dispersant/emulsifier, the combined amount, if more than one dispersant/emulsifier is present, can be from 5 wt % to 35 wt % (based on the total weight of the formulation). Other examples includes weight percents of from 10 wt % to 35 wt %, 15 wt % to 35 wt %, 20 wt % to 35 wt %, 25 wt % to 35 wt %, 30 wt % to 35 wt %, 10 wt % to 20 wt %, or other amounts within these ranges. When more than one dispersant/emulsifier is present, the weight ratios amongst each dispersant/emulsifier can be on a 1:1 weight ratio, 2:1 weight ratio, 3:1 weight ratio, 4:1 weight ratio, 5:1 weight ratio, or any weight ratio ranging from 1:20 to 20:1. When three dispersants/emulsifiers are present, the weight ratios can be evenly divided on a 1:1:1 basis, or can be present at various other ratios, such as 1:1:15 to 15:1:1 to 1:15:1, or any ratios in between any of these weight ratio ranges. When more than one dispersant/emulsifier is present, the weight percent of each one can be within ±1 wt %, ±5 wt %, ±10 wt %, ±15 wt %, ±20 wt %, ±25 wt %, ±30 wt % of each other. As an example, one or each dispersant/emulsifier can be present in an amount of from 1 wt % to 5 wt % or more, such as 2 wt % to 4 wt %, based on the weight percent of the oil-based formulation.

As an option, at least one solvent can be present in the release aid. The solvent can be one solvent, two solvents, three solvents, or four or more types of solvents. The solvent can be present in any amount, such as from about 0.1 wt % to 5 wt %, such as from about 0.1 wt % to about 3 wt %, or from about 0.5 wt % to about 4 wt % based on the weight percent of the release aid. The solvent can be an alcohol(s), which can include the class of fatty alcohols. One example of an alcohol that can be used in the present invention is a primary alcohol. For instance, the primary alcohol can contain one or more types of carbon chain isomers. For instance, the alcohol can contain one or more $C_8$ to $C_{14}$ carbon chain isomers; for instance, $C_{10}$ to $C_{13}$ carbon chain isomers. A more particular example is an alcohol that contains $C_{12}$ and $C_{13}$ carbon chain isomers. For instance, the alcohol can be considered an isomeric $C_8$-$C_{14}$ primary alcohol, an isomeric $C_{10}$-$C_{13}$ primary alcohol, an isomeric $C_{12}$-$C_{13}$ primary alcohol, and the like. Commercial sources can be Sasol, under the product name SAFOL alcohol, such as SAFOL 23 alcohol, and the like. The alcohols that can be used can be or consist of linear end branched isomers, such as linear end mono-methyl branched isomers in various ratios. For instance, the alcohol can contain from about 30% to 75% linear (e.g., 50% to 60% linear), and from 10% to 50% branched isomers (e.g., such as 25% to 35% branched isomers). The alcohol can be present in an amount of from about 0.1 wt % to about 3 wt %, such as from about 0.1 wt % to about 2 wt %, 0.1 wt % to about 1.5 wt %, 0.5 wt % to about 1 wt %, based on the total weight of the formulation. For purposes of the present invention, the alcohol can be a fatty alcohol, which can be considered an aliphatic alcohol which can contain, for instance, a chain of from 8 to 36 carbon atoms or 8 to 22 carbon atoms, and the like.

As an option, at least one fatty acid can be present. The fatty acid can act as a solvent, co-solvent, and/or a dispersant. One or more fatty acids can optionally be used in the present invention. One example of a suitable fatty acid is a tall oil fatty acid. The fatty acid used in the present invention can be a monomer acid, for instance, one that is obtained from the manufacturing process to make a tall oil fatty acid.

Other examples of fatty acids include, but are not limited to, oleic fatty acid, linoleic fatty acid, stearic fatty acid, isostearic fatty acid, lauric fatty acid, or other fatty acids derived from corn oil or other agricultural oils, such as soy, safflower, rapeseed, and the like. If the fatty acid(s) is present, which is optional, the fatty acid can be present in an amount of from 0.5 wt % to about 5 wt %, such as from about 0.5 wt % to about 4 wt %, such as from about 1 wt % to about 2 wt %, based on the total weight of the oil-based formulation of the present invention. For purposes of the present invention, the fatty acid can include liquid fatty acids derived from or a derivative of oils as mentioned above. Thus, for purposes of the present invention, the fatty acid can be considered a fatty acid derivative or an oil that has been ethoxylated or alkoxylated.

The formulation can be considered a blend, wherein each of the components in preparing the formulation can be mixed or otherwise combined together to form a formulation. Conventional mixing equipment, such as a tank with an agitator or in-line mixing using a static mixer, can be used to mix the components together. In preparing the formulation, any order of addition of the various components can be used to form the formulation.

The water, if present in the concentrate formulation, can be present in an amount of from 0 wt % to 10 wt %, 0.1 wt % to 10 wt %, 0.5 wt % to 10 wt %, 1 wt % to 10 wt %, 1.5 wt % to 10 wt %, 2 wt % to 10 wt %, 5 wt % to 10 wt %, 1 wt % to 5 wt %, 2 wt % to 5 wt %, or any amounts within these ranges, wherein the weight percents are based on the total weight percent of the formulation.

As indicated, a modifier, as an option, can be used in the adhesive formulation of the present invention. The modifier can be considered a hardening agent and can be any component that hardens the coating created by the adhesive to provide some rigidity or robustness to the coating. Examples include, but are not limited to, polyols (sugar alcohols) such as glycerine, sorbitol, erythritol, hydrogenated starch hydrolysates, isomalt, lactitol, maltitol, mannitol, sorbitol, xylitol, or any combinations thereof. The modifier can be present, based on weight percent of the adhesive formulation, in a total amount of from 0 wt % to 50 wt %, such as from 1 wt % to 25 wt %, or from 2 wt % to 10 wt %, or other amounts.

The adhesive formulation, as an option, may contain additional additives. The formulation can have no additional additives included.

In the formulation, the alkoxylated starch(es) can be present in an amount of from 30 wt % to 60 wt % (e.g., 35 wt % to 60 wt %, 40 wt % to 60 wt %, 45 wt % to 60 wt %, 50 wt % to 60 wt %), the resin can be present in an amount of from 60 wt % to 0 wt % (e.g., 0 wt % to 50 wt %, 1 wt % to 50 wt %, 1 wt % to 40 wt %, 1 wt % to 30 wt %, 1 wt % to 20 wt %, 5 wt % to 10 wt %, 10 wt % to 50 wt %, 20 wt % to 50 wt %), the release aid can be present in an amount of from 0 wt % to about 25 wt % (e.g., 0 wt % to 20 wt %, 1 wt % to 20 wt %, 5 wt % to 20 wt %, 7 wt % to 20 wt %, 10 wt % to 20 wt %), the modifier can be present in an amount of from 0 wt % to about 25 wt % (e.g., 0 wt % to 20 wt %, 1 wt % to 20 wt %, 5 wt % to 20 wt %, 7 wt % to 20 wt %, 10 wt % to 20 wt %), and water can be present in an amount of from 0 wt % to 69 wt % (e.g., 1 wt % to 69 wt %, 1 wt % to 60 wt %, 5 wt % to 60 wt %, 10 wt % to 60 wt %, 15 wt % to 60 wt %, 20 wt % to 60 wt %, 30 wt % to 60 wt %), wherein the weight percents are based on the total weight percent of the formulation.

The adhesive formulation, in either the concentrate or dilute forms, can have a solids content (non-aqueous content) based on weight comprising (in wt %) 40%-100% alkoxylated starch, 60% to 0% different resin, 0% to 25% release aid, and 0%-25% modifier, or 40%-80% alkoxylated starch, 60% to 20% different resin, 5% to 25% release aid, and 5%-25% modifier, or 50%-70% alkoxylated starch, 50% to 30% different resin, 12% to 25% parts release aid, and 12%-25% modifier. The adhesive formulation, as an option, can have a solids content comprising the alkoxylated starch in an amount of 1 to 5 parts, a different resin in an amount of 0 to 5 parts, the release aid in an amount of 1 to 2 parts, and the modifier in an amount of 1 to 2 parts.

The adhesive formulation can be considered a blend, wherein each of the components in preparing the adhesive formulation can be mixed or otherwise combined together to form a formulation. Conventional mixing equipment, such as a tank with an agitator or in-line mixing using a static mixer, can be used to mix the components together. In preparing the formulation, any order of addition of the various components can be used to form the formulation.

The adhesive formulations of the present invention can be storage stable, meaning that the components that form the adhesive formulation do not significantly separate or settle over time. For instance, the storage stability of the adhesive formulations of the present invention can be at least 20 days, or at least 30 days, or at least 45 days, or at least three months, or at least six months, at a storage temperature of from 0° C. to 50° C. During this time period, the ingredients that form the adhesive formulation will not separate or settle to any significant degree (e.g., less than 5 wt %, less than 1 wt % (based on the total weight of the adhesive formulation) will separate or settle during this time period and, preferably, 0.1 wt % to 0 wt % will separate or settle during this time period).

The present invention can relate to the manufacture of creped paper including soft, absorbent, strong tissue paper webs and particularly to the mode of creping of such webs to attain adequate softness and adhesive characteristics in the web while minimizing operational difficulties. The paper web that is creped can be obtained from virgin pulp sources and/or from recycled sources, such as mixed office waste. The present invention is useful with paper webs formed from or including mixed office waste recycled sources, or sorted office papers. The adhesive formulation of the present invention can be considered a creping formulation that can be diluted with water for such manufacture of creped paper. The adhesive formulation of the present invention can be considered a Yankee dryer coating composition or Yankee dryer release coating composition that can be diluted with water. The adhesive formulation can be considered a TAD fabric coating formulation that can be diluted.

It is known in the art to form a thin paper web from a slurry of water and fiber, dewater the wet web, and then at least partially dry the dewatered web. The web then can be conveyed or carried on a fabric to a large steam-heated rotary drum known as a Yankee dryer. The web commonly enters the dryer at a circumferential dryer position which is a major portion around the dryer from the zone of web de-contact from the drum. The web commonly enters the dryer at a circumferential dryer position that is preferably at least about halfway around, and more preferably at least about 75% around, the cylindrical dryer with respect to the zone of web de-contact from the drum. The de-contact zone can be equipped with a creping blade against which the web abuts so as to be pushed backwardly upon itself and foreshortened to attain the well-known tissue crepe paper structure. The creping action on a Yankee dryer requires that the web be well adhered to the dryer to effect a consistent and uniform creping action, and for example, to prevent flaring of the web from the dryer before or at the exit zone in the vicinity of the creping blade. In some instances, the web is presented to the dryer at a considerable moisture content that is typically as high as about 80%. Such webs accordingly have fiber consistencies at the point of contact with the dryer of about 20% or higher.

The adhesive formulation (e.g., in diluted form as indicated above) can be applied to a Yankee dryer or other cylindrical dryer used in such a creping process. The adhesive formulation can be applied on a continuous basis, semi-continuous basis, intermittent basis, or a one time basis to the cylindrical dryer surface prior to rotating, during rotation, or both. The adhesive formulation of the present invention can be applied to the surface of the cylindrical dryer (e.g., after the creping blade and before the web transfer location), to the fiber web prior to being applied onto the cylindrical dryer surface, or during application of the fiber web onto the cylindrical dryer surface, and/or after the fiber web application to the cylindrical dryer surface. The adhesive formulation can be applied by the use of one or more spray nozzles of a spray boom, a roll coater, an impregnation bath for the fiber web, or other coating device. The application rate or use rate of the adhesive formulation can be from 0.1 mg/m$^2$ of dryer surface to 40 mg/m$^2$ of dryer surface, such as from 0.1 mg/m$^2$ of dryer surface to 20 mg/m$^2$ of dryer surface, or from 0.1 mg/m$^2$ of dryer surface to 10 mg/m$^2$ of dryer surface, or from 1 mg/m$^2$ of dryer surface to 10 mg/m$^2$ of dryer surface, or from 5 mg/m$^2$ of dryer surface to 10 mg/m$^2$ of dryer surface, or other amounts. The alkoxylated starch component can be present in a diluted adhesive formulation used for coating a dryer surface of a Yankee drum in an amount of from 0.5 wt % to 10 wt %, such as from 0.5 wt % to 5 wt %, or from 1 wt % to 5 wt %, or from 0.5 to 3 wt %, or from 1 wt % to 3 wt %, or from 2 wt % to 3 wt %, or from 0.5 wt % to 2 wt %, or other amounts.

In some modes of operation, commonly referred to as through-drying (also known as through air drying or TAD), contact of the web with a dryer surface is limited. In a through-drying operation, the web formed from the slurry of water and fiber is dewatered without significantly mechanically pressing the wet web using vacuum and hot air blast drying action. The web can be carried by a structured fabric during the through-air drying. As an option, the webs can be creped or foreshortened as part of the through-air drying process, wherein no further drying or creping of the web is performed on a Yankee dryer. As an alternative option, webs dried by TAD can be pressed after through-air drying to a Yankee dryer, which can be pre-coated with the adhesive formulation, using a knuckled fabric so that the web adheres to the dryer in closely spaced zones, with bulking of the web between the zones. Fabrics having as fine a count as 4,900 openings per square inch and above may serve the purpose. The fiber consistency of such webs when presented to a Yankee dryer may be from about 30% to about 90% fiber. Higher fiber-consistency webs commonly can require an adhesive to adequately secure the web to the dryer for completion of both the drying action and creping action.

Referring now to the drawings, FIG. 1 is a flow chart showing a series of steps included in a method according to the present invention that can be used for the formation of a creped tissue paper web (process 100). Such webs can have a finished basis weight, for example, in the range of from about 1 to about 80 pounds per 3,000 square feet, or from about 7 to about 40 pounds per 3,000 square feet, or other basis weights, and can be formed from aqueous fiber slurries. According to the present invention, in steps 101-102, a thin paper web can be formed from a slurry of water and fiber using a conventional web forming technique or other suitable method, and then in step 103, the web can be dewatered at least in part, such as at least partially dried. For example, the slurry can be directed to a conventional Fourdrinier drainage wire to form a fiber web. Partial dewatering of the fiber web can occur through the wire in a conventional manner. Further dewatering performed on the fiber web may comprise mechanical pressing, through-air drying operations, or combinations thereof. The fibrous web can be formed of various types of wood pulp based fibers which are used to make the above products, such as hardwood kraft fibers, softwood kraft fibers, hardwood sulfite fibers, softwood sulfite fibers, chemi-thermo-mechanical fibers, thermomechanical pulps, refiner mechanical pulps, recycled paper fibers, or other pulp fibers, or any combinations thereof. As an option, before transfer to the Yankee dryer or other rotary dryer, the fiber web can be dried to a fiber consistency of from about 10% by weight to about 90% by weight, or from about 20% by weight to about 80% by weight, or from about 25% by weight to about 75% by weight, or from about 40% by weight to about 60% by weight, or from 40% by weight to about 50% by weight, or other values, before being conveyed to the web dryer surface. For purposes herein, "fiber consistency" refers to the percentage value of dry fiber weight relative to the total weight of the web. As an option, the "moisture content" of the web may constitute most or all of the balance of the web weight. For example, the fibrous web, prior to application to the Yankee dryer or other rotary dryer, can have moisture contents, for example, of from about 90% by weight to about 10% by weight, or from about 80% to about 20% by weight, or from about 75% to about 25% by weight, or from about 60% by weight to about 40% by weight, or from about 50% to about 60% by weight, or other values, can be processed according to the methods of the present invention. Such webs accordingly would have fiber contents making up the additional weight % of the web. After dewatering, the web can then be conveyed, e.g., carried on a fabric, to a creping dryer or web dryer, which can be, for example, a steam-heated rotary drum dryer, referred to herein and elsewhere as a Yankee dryer. Before receiving the fiber web, an adhesive dryer surface of the Yankee dryer can be coated with an adhesive formulation of the present invention, which can involve steps 104-106 in this illustration.

In step 104 shown in FIG. 1, creping adhesive formulation components including alkoxylated starch are fed, recirculated, or both into a mixing pot or other suitable mixing vessel, which can be equipped for agitation of its contents. Although not shown, the creping adhesive base formulation components can be fed into a closed loop system, such as a pressurized closed loop system, or can be fed into a once through application system. As an option, the creping adhesive composition can be prepared as an aqueous film-forming dispersion of the active components including alkoxylated starch and any other additives. In step 105, the resulting creping adhesive composition is coated on a dryer surface of a Yankee dryer or other large rotary dryer, and an adhesive dryer surface is formed. In step 106 shown in FIG. 1, the dewatered and partially dried wet paper web is conveyed, for example, carried on a fabric, and transferred to the adhesive dryer surface of a large rotary dryer, such as a steam-heated and/or hood heated rotary drum dryer, referred to herein and elsewhere as the Yankee dryer. A Yankee dryer can be a large diameter, typically about 8 to about 20 foot diameter drum, or other diameters, which is designed to be pressurized with steam to provide a hot surface for completing the drying of papermaking webs at the end of the papermaking process. The web can be transferred to the dryer, for example, at a circumferential dryer position, such as a position at least about halfway around, or at least about 75% around, the cylindrical dryer with respect to the zone of web de-contact where the creped web is separated and removed from the drum. The transfer fabric can be, for example, a transfer and impression fabric having knuckles which can compact a portion, e.g., about 20% or other amounts, of the surface of the web on a creping or Yankee dryer, to form a knuckled fiber web. As an option, the creping adhesive composition can retain the knuckled fiber web on the web dryer surface until a fiber consistency of the web is about 75% by weight or more, for example, at least about 95% by weight. In some modes of operation referred to herein as through-air drying, contact of the web with the dryer surface is limited. Methods and systems of through-drying operations which optionally may be used in the present invention include those such as described in U.S. Pat. No. 6,991,707 B2, which is incorporated herein by reference. The methods of the present invention can be used, for example, with through-air drying systems with creping methods, with Yankee dryer systems and methods, and with wet-crepe machines, systems, and methods. In step 107, the web can be retained on the adhesive dryer surface while carried around or on the dryer until reaching a de-contact zone. In step 108, the de-contact zone can be equipped with a creping device, such as a creping blade or doctor blade, against which the web abuts so as to be pushed or compacted backwardly upon itself and attain a recognizable tissue crepe paper structure. In step 109, the creped web can be recovered off the dryer. The web can be creped from the dryer to form a dried web having a fiber content or consistency, for example, of about 75% by weight or higher, for example, at least about 90% by weight, or at least about 95% by weight, or at least about 97% by weight consistency, or from about 85% to about 97% by weight consistency, or from about 90% to about 97% by weight consistency, and then can be wound into rolls or otherwise be collected off the dryer. At the creping stage, the fibrous web can have a water content, for example, of less than 25% by weight, or less than 15% by weight, or less than about 10% by weight, or less than about 7% by weight, or less than about 5% by weight, or from about 10% to about 3% by weight, or other amounts.

Figure 2:
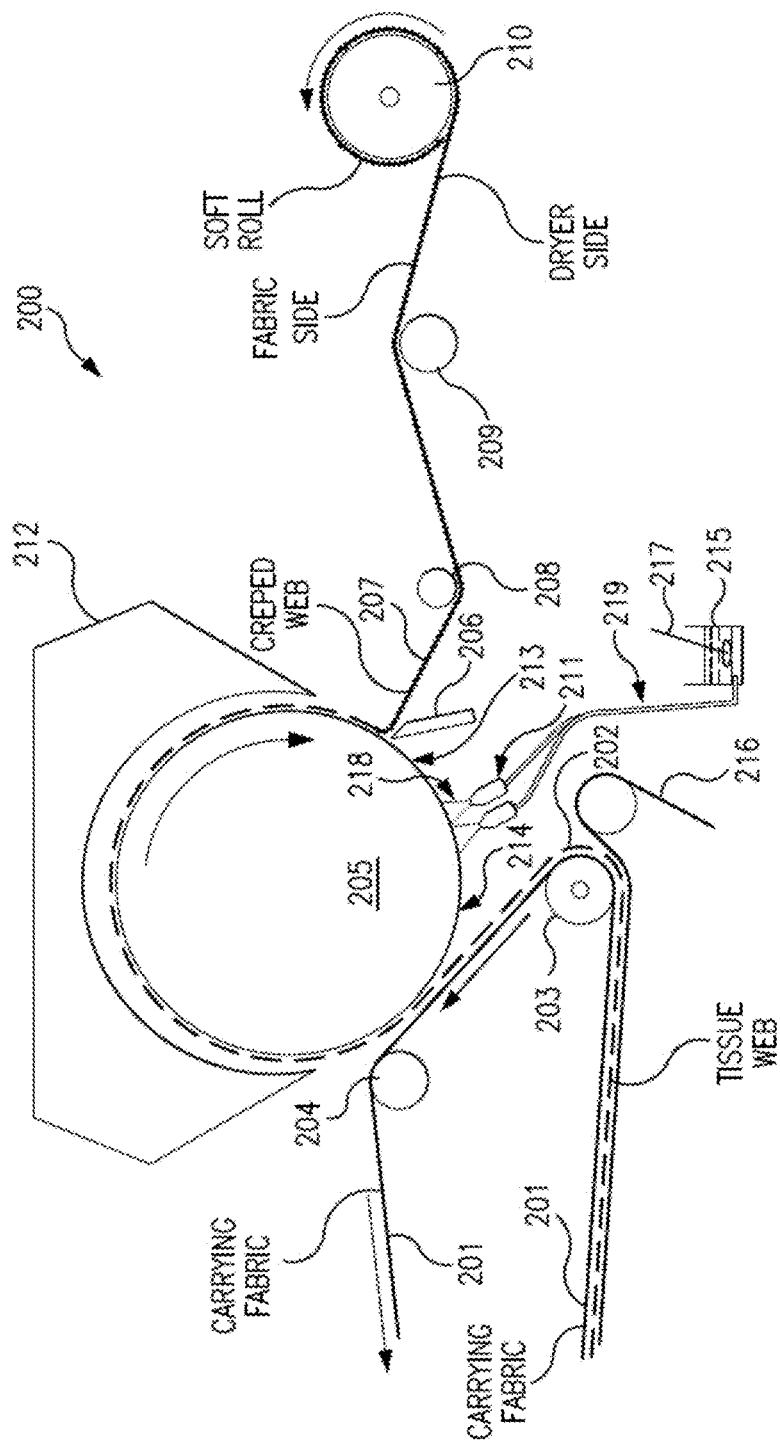
FIG. 2 is a schematic illustration of a creping system with a Yankee dryer that can be used to perform a creping method according to the present invention.

Referring to FIG. 2, a system 200 is shown for creping tissue with applying of a creping adhesive composition 218 to a Yankee dryer 205 according to a method of the present invention. The transfer and impression fabric designated reference numeral 201 can carry the formed, dewatered and partially dried web 202 around turning roll 203 to the nip between press roll 204 and Yankee dryer 205. A supplemental lower carrier designated at 216 may also be employed to carry the web in sandwich fashion, which may be particularly useful under conditions of higher web dryness. The fabric, web, and dryer move in the directions indicated by the arrows. The entry of the web into the dryer is well around the roll from creping blade 206, which, as is schematically indicated, crepes the traveling web from the dryer as indicated at 207. The creped web 207 exiting from the dryer passes over guide and tension rollers 208, 209 and is wound into a soft creped tissue roll 210. To adhere a partially dried and dewatered paper web 202 (at, for example, 10-90 wt. % fiber consistency) entering the dryer to the surface of the dryer, a spray boom 211 can be used to apply a creping adhesive composition 218 to the dryer surface 213 which is exposed after de-contacting the creped tissue web 207 from the dryer 205 to provide an adhesive dryer surface 214 ahead of the nip between the press roll 204 and Yankee 205. The spray boom 211 can be a single spray boom or multi-spray boom, such as a dual-spray boom as illustrated. The spray boom can include an overspray collection container (not shown). The spray boom 211 is fluidly connected 219 to a mixing pot 215 for feeding creping adhesive composition from the mixing pot. The mixing pot 215 can be equipped with an agitator 217. The adhesive formulation components including the alkoxylated starch can be introduced into the mixing pot 215 in any convenient manner. The resulting creping adhesive composition can be pumped or otherwise fed under pressure to the nozzle sprayer(s) of the spray boom 211. To promote drying of the web on the dryer, the Yankee 205 can be internally steam heated by conventional or other suitable arrangements (not shown), externally heated using a hood 212, or using both. This sprayed composition 218 optionally may be applied to the traveling web 202 directly, but is preferably directly sprayed onto the dryer surface 213, such as to limit the pickup of adhesive by the web and to limit the penetration of adhesive through the web to the carrying fabric. Sprayer systems and arrangements which can be adapted and used in methods of the present invention include, for example, those described in U.S. Pat. No. 6,465,047 B1, which is incorporated herein by reference in its entirety.

Figure 3:
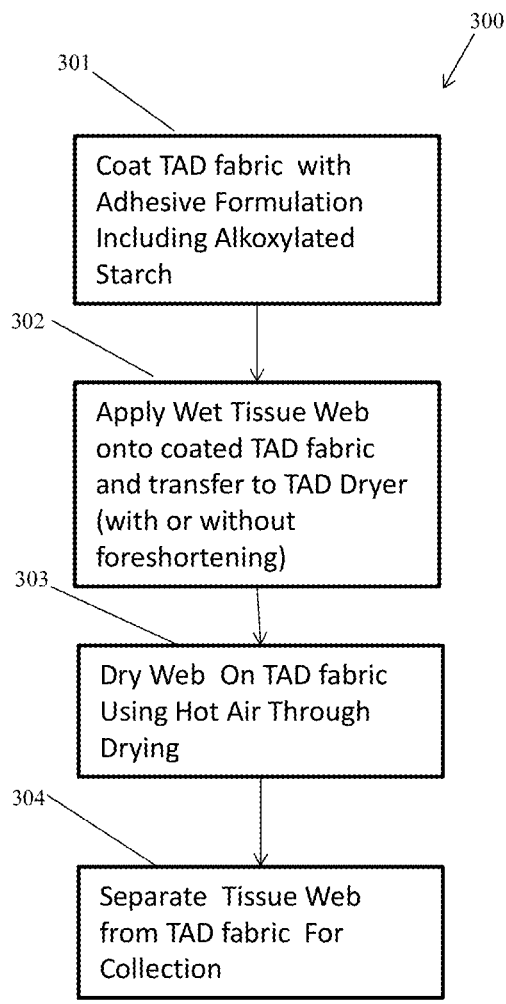
FIG. 3 is a process flow chart illustrating a process according to the present invention.

FIG. 3 is a flow chart showing a series of steps included in a method according to the present invention that can be used for the formation of a dried tissue paper web using a TAD coating process and without a Yankee (process 300). In step 301, a TAD fabric can be coated with an adhesive formulation which contains alkoxylated starch in step. The adhesive formulation used for this method can include PVOH, as an option, in combination with the alkoxylated starch. The PVOH can be used as a co-additive to build up a sufficient coating. In step 302, a wet tissue web can be applied onto the coated surface of the TAD fabric. The wet tissue optionally can be foreshortened before it is transferred onto the coated TAD fabric to induce creping-like effects on the web. Techniques for foreshortening a wet tissue web are known, which can be applied, such as by transferring a newly formed wet tissue web form the forming fabric or wire to a slower moving transfer fabric, which in turn transfers the web to a TAD fabric. Methods and equipment arrangements for foreshortening a wet tissue web which can be applied to a TAD operation are shown, for example, in U.S. Pat. No. 5,888,347, which is incorporated herein by reference in its entirety. In step 303, the tissue web is dried on the TAD fabric as the layup of these layers is conveyed through at least one dryer in which hot air is passed through the tissue web. In step 304, after exiting the dryer, the dried tissue web is separated from the TAD fabric for collection. As an option, no further drying or creping processing need be applied to the tissue web that has been processed in the TAD operation.

Figure 4:
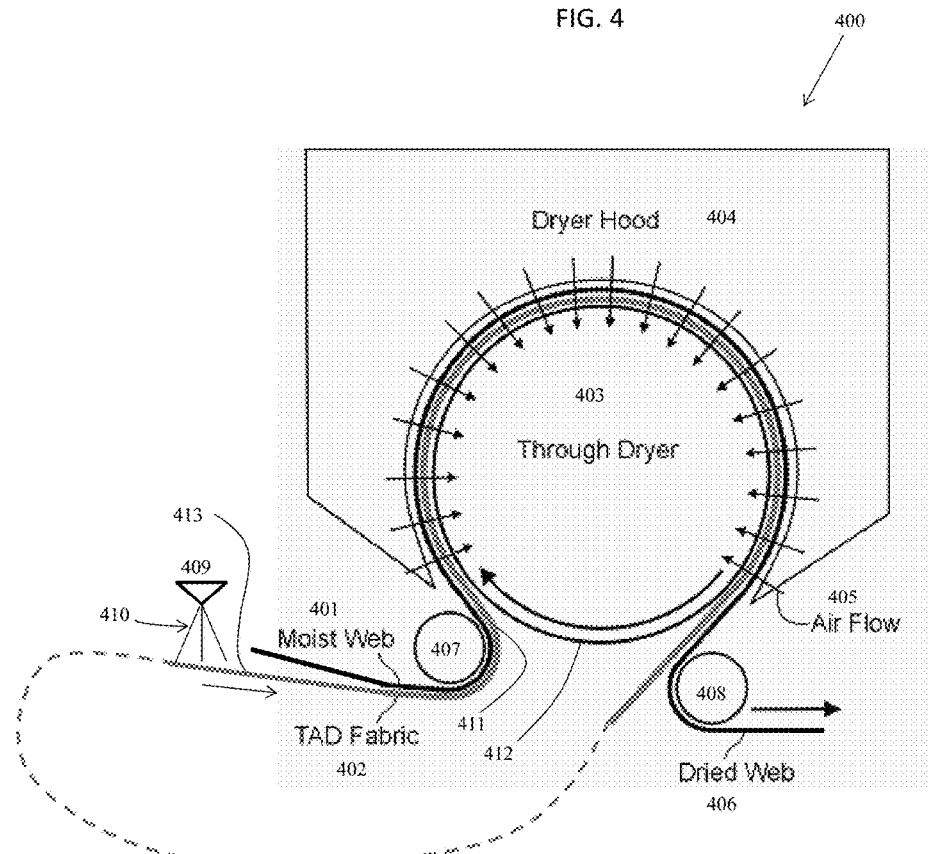
FIG. 4 is a schematic illustration of a TAD dryer system that can be used to perform a method according to the present invention.

FIG. 4 shows a TAD system that includes a TAD fabric coater and through-air dryer unit of the TAD system. In system 400 shown in this figure, a moist tissue web 401 is placed on a coated surface 413 of TAD fabric 402. The TAD fabric 402 can be precoated at coating station 409 with a formulation 410 that includes alkoxylated starch. To simplify this illustration, only segments of the TAD fabric 402 and the moist tissue web 401 are shown where they pass through the through-air dryer 403. The moist tissue web 401 can be received from a paper forming unit (not shown), such as a conventional wire forming unit. The TAD fabric 402 can have an endless loop or belt structure, as indicated by the dashed lines, which can be guided around additional rollers (not shown) to provide a continuous structure. The resulting layup 411 of the moist tissue web and coated TAD fabric is conveyed around the rotatable through-air dryer 403 with hot air inflow 405 from a dryer hood 404, and then the dried web 406 is separated from the TAD fabric 402 after the layup emerges from the through-air dryer unit 403. Once the dried web 406 is separated from the TAD fabric 402, the TAD fabric 402 can be directed through a cleaning section (not shown), e.g., a spray washing station, before it is directed back to the coating station 409 for re-use (as indicated in dashed lines). Directional arrows shown for TAD fabric 402, through-air dryer 403, and dried web 406 indicate directions of movement of these components during processing in the TAD system. The TAD fabric itself can be a foraminous structure which can permit air-flow through its thickness. The formulation 410 can be applied to a surface of the TAD fabric 402 at a coating rate useful for imparting a good balance of adhesion and release between the components without blinding the TAD fabric to airflow. The coating rate of the adhesive formulation on the TAD fabric in this through-air drying process can range from 0.1 mg/m$^2$ to about 100 mg/m$^2$ of TAD fabric surface, such as from 1 mg/m$^2$ to 80 mg/m$^2$ of TAD fabric surface, or from 2 mg/m$^2$ to 70 mg/m$^2$ of TAD fabric surface, or from 5 mg/m$^2$ to 50 mg/m$^2$ of TAD fabric surface or other amounts. The alkoxylated starch component can be present in a diluted adhesive formulation used for coating a TAD fabric in an amount of from 0.5 wt % to 10 wt %, such as from 0.5 wt % to 5 wt %, or from 1 wt % to 5 wt %, or from 0.5 to 3 wt %, or from 1 wt % to 3 wt %, or from 2 wt % to 3 wt %, or from 0.5 wt % to 2 wt %, or other amounts. The through-air dryer 403 can be a rotatable drum that has an outer drum surface 412 used for supporting the layup 411. Roll 407 can be used to guide and convey the layup to the drum surface 412. As an option, a moist web 401 transferred to coated TAD fabric 402 can then pass over a porous through-air dryer 403, such as a honeycomb roll or drum, through which heated air passes from drying hood 404 after impinging and passing through the layup. The hot air 405 passing through the web 401 in the layup can provide high heat transfer rates and effective drying without significant compression of the web. After the TAD fabric 402 and the dried paper web 406 exit the through-air dryer 403, the dried paper web 406 can be separated from the TAD fabric 402 by a separation device comprising, for example, a separation roll 408 as shown or, in the alternative, a transfer device such as a suction roll (not shown) or like devices useful for separating a dried paper web from a TAD fabric. The separation roll 408 or other separation device may be further assisted by an air jet device (not shown), such as an air knife, disposed within the loop of the TAD fabric 402 generally opposite the separation device which can blow air through the TAD fabric to impinge a surface of the dried paper web 406 and push it away from the TAD fabric. The dried web 406 can be transported from separation roll 408 to a reel-up (not shown) by, for example, a permeable transport fabric (not shown). Though a single inward flow through-air dryer 403 is shown for drying the web 401, it will be appreciated that a single outward flow through-air dryer may be used instead of an inward flow through-air dryer, or a plurality of inward flow through-air dryers in a series or a plurality of outward flow through-air dryers in a series may be used, or at least one inward flow through-air dryer may be used in combination with at least one outward flow through-air dryer in series.

This TAD system can be used in tissue or paper production without a Yankee dryer or with a Yankee dryer. As an option, the through-air dryer 403 can comprise the final drying section for the paper web 406. The wet tissue web can be foreshortened without use of a Yankee for creping. As an option, to foreshorten a tissue web without use of a Yankee, wet tissue web 401 can be transferred using a rush transfer technique from a forming section wire (not shown) to a second slower-moving transfer fabric (not shown) to foreshorten the moist paper web before it is transferred to the coated TAD fabric 402. Configurations which can be used to foreshorten a wet tissue web from the forming wire section and before through-drying are shown for example in the incorporated U.S. Pat. No. 5,888,347.

Figure 5:
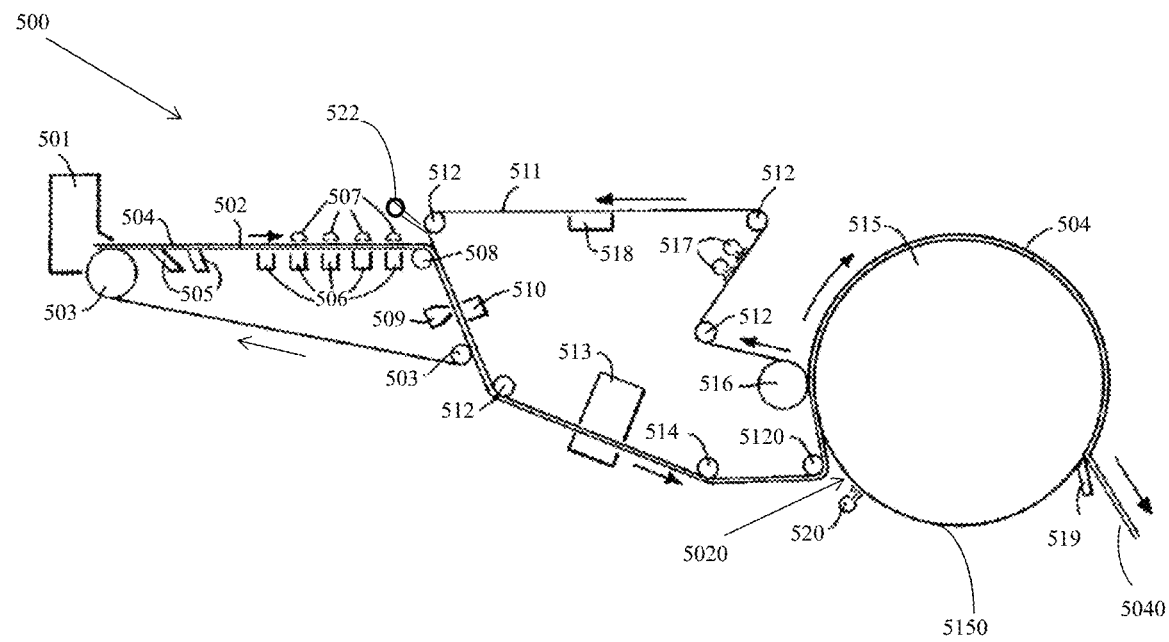
FIG. 5 is a schematic illustration of a creping system with through-air drying (TAD) and a Yankee roll that can be used to perform a creping method according to the present invention.

FIG. 5 is a schematic illustration of a web drying and creping system which includes a combination of through-air drying (TAD) and a Yankee. In system 500 shown in this figure, a papermaking furnish can be delivered from a headbox 501 to a Fourdrinier wire 502 supported by a roll 503. An uncompacted paper web 504 is formed, and the wire 502 can pass over optional forming boards 505. Toward the dry end of the forming section, the wire 502 with the wet paper web 504 supported thereon can pass over a plurality of suction boxes 507. Five suction boxes are shown in the illustration, the last four of which may be equipped with steam nozzles 506, or other numbers of these boxes may be used. After passing the vacuum boxes 507, the wire and the moist web can pass around a wire return roll 508 where the web 504 is sandwiched between wire 502 and TAD fabric 511. The TAD fabric can be a structured fabric used for impressing a three-dimensional structure against a confronting surface of web 504. As an option, the TAD fabric 511 can be coated on its upper surface with the adhesive formulation, such as using a sprayer 522, prior to contacting web 504 between rollers 508 and 512. The web 504 can be conveyed downwardly between a slotted steam nozzle 509 and a vacuum box 510. After this point, the paper web 504 can transferred without compaction to the selected TAD fabric 511 and continues over a TAD fabric return roll 512 to a hot air blast dryer 513 used for through-drying of web 504. From there, the TAD fabric 511 and the thermally pre-dried paper web can pass over a straightening roll 514, which can prevent the formation of wrinkles in the imprinting fabric, and over another TAD fabric return roll 5120 to be transferred onto the surface 5150 of a Yankee dryer drum 515. The knuckles of the imprinting fabric 511 can then be impressed into the pre-dried but as yet uncompacted paper sheet 504 by the pressure roll 516. The TAD fabric 511 then can return to the wire 502 over several TAD fabric return rolls 512, and can be cleaned (e.g., washed) free of clinging fibers by sprays 517 and dried by vacuum box 518 during its return.

The impressed paper sheet 504 continues from the impression nip roll 516 along the periphery of the Yankee drum dryer 515 for drying and is creped from the Yankee dryer surface with a creping blade 519, such as with a doctor blade. The creped web 5040 can be wound from the dryer surface after creping, such as in a similar manner as shown in the system of FIG. 1. The surface 5150 of the Yankee dryer can be sprayed with the adhesive formulation which contains alkoxylated starch and any other co-additives from sprayer 520 to form a coating 5020 on the dryer surface. The coating 5020 can improve the bond between the knuckle imprints of the paper sheet and the Yankee dryer surface during drying, and permit release of the web at creping. This sprayed composition optionally may be applied to the traveling web 504 at or before the transfer roller 5120 adjacent the Yankee drum 515, but is preferably directly sprayed onto the dryer surface 5150. To promote drying of the web on the dryer, the Yankee 515 can be internally steam heated by conventional or other suitable arrangements (not shown), externally heated using a hood (not shown), such as shown in FIG. 1, or using both.

Creping systems, methods, and adhesives are described in the following U.S. Pat. Nos. which are incorporated herein in their entireties by reference: U.S. Pat. Nos. 3,640,841; 4,304,625; 4,440,898; 4,788,243; 4,994,146; 5,025,046; 5,187,219; 5,326,434; 5,246,544; 5,370,773; 5,487,813; 5,490,903; 5,633,309; 5,660,687; 5,846,380; 4,300,981; 4,063,995; 4,501,640; 4,528,316; 4,886,579; 5,179,150; 5,234,547; 5,374,334; 5,382,323; 5,468,796; 5,902,862; 5,942,085; 5,944,954; 3,301,746; 3,879,257; 4,684,439; 3,926,716; 4,883,564; and 5,437,766.

As indicated, the adhesive formulation of the present invention can be considered the concentrated product, which can be diluted, such as on site of the creping location in a mix pot or in line with other materials that are to be sprayed on the cylindrical dryer. With the use of the adhesive formulations of the present invention, a superior balance of adhesion and release properties of the fiber web from the surface of a dryer or TAD fabric can be achieved. Comparable or better tack profiles using a biodegradable additive at lower use rates of conventional PVOH or wet strength resins can be obtained with adhesive formulations of the present invention.

The adhesive formulation of the present invention can be used in other applications of the paper industry or other industries. The adhesive formulation of the present invention can be considered biodegradable, and/or non-toxic, and/or contains one or more food-grade components.

The present invention will be further clarified by the following examples, which are intended to be exemplary of the present invention.

EXAMPLES

Example 1

In this example, adhesive formulations (2.5 wt % solids content) were prepared which contained a cationic alkoxylated starch ("XP13-2228 JTA") as the sole adhesive or combined in 50:50 wt:wt blends with another coating adhesive, in aqueous dispersions. The cationic alkoxylated starch was a modified starch obtained commercially as an aqueous modified carbohydrate dispersion under the product name TOPCOAT® L95 from Penford Products Co. (30% solids, pH=5.0-6.0, DS=0.15, pourable liquid form). DS is a measure of charge density. The different adhesive chemistries used in some formulations were polymer-containing compositions, which were a regular wet strength resin comprising poly(amidoamine) epichlorohydrin (PAAE) ("WSR", which was commercially available as BUBOND® 167), or modified PAAE resins that were commercially obtained as BUBOND® 2624 ("2624") and BUBOND® 2620 ("2620"). The indicated BUBOND® products are modified PAAE products that are a source of crosslinkable polymer, which are products of Buckman Laboratories International, Memphis Term. USA. The component or components in each formulation were diluted in deionized water to obtain a solids content (actives content) of 2.5 wt %, and a water content of 97.5 wt %. In the formulations combining the cationic alkoxylated starch and a different adhesive component (PAAE source), the different adhesives were combined at a 50:50 (by wt) mixing ratio such that each adhesive was contained in the dilute formulation in an amount of 1.25 wt %, in combination with 97.5 wt % water.

Figure 6:
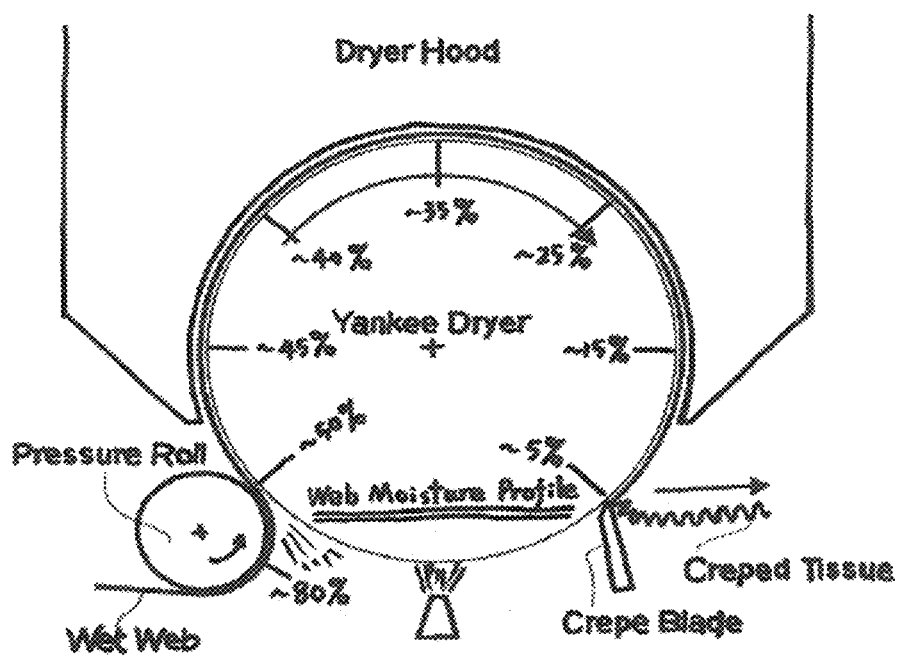
FIG. 6 is a schematic illustration of a creping system that includes illustrative moisture content values with respect to locations around the circumference of a Yankee dryer surface which can be used in a creping method according to the present invention.

Laboratory experiments were performed on the formulations in order to evaluate their tack profiles as a function of tissue moisture content. FIG. 6 is a schematic of a Yankee dryer which shows an example of a web moisture profile of a web that travels around the dryer surface for drying and creping on the Yankee dryer that is coated with a formulation of this example. The indicated laboratory results can be correlated to Yankee dryer locations where the wet tissue would be expected to have corresponding moisture contents and tack values for those positions, such as nearer or more distant from the wet web transfer location, the creping blade location, and so forth. These adhesive formulations were evaluated in the laboratory for performance as a Yankee coating adhesive by measuring a tack curve for the formulation as a function of tissue moisture content for each formulation. These formulations were then subjected to a simulated roller test, which is known as a tackiness tester. In this tackiness test, the formulations of the present invention (and any comparative or controls) were applied to two separate metal plates having at least one hole in the metal plate to receive a probe. The tip of the probe was covered in a cotton cloth. In the test, the mixture, in an amount of 5 $mg/m^2$, was applied onto the plate, and the plate was subjected to a temperature of 140° C. for 10 minutes to cure the adhesive/release formulation. Then, the temperature of the plate was raised to 170° C., and the probe with the cotton cloth was inserted into the hole of the metal plate at a force of 200 g for 5 seconds, and then removed and the amount of force (in grams) to remove the probe from the metal plate a distance of ½ cm at a speed of 5 cm/minute was measured. This test was repeated 9 times every 30 seconds. Thus, 10 measurements were obtained per data point in the FIG. 7 and the Coating Film Tack (g) is a measurement average from the 10 measurements for the amount of force (in grams) to remove the probe from the metal plate. The results of the tack test measurements for the formulations are shown in FIG. 7. For all examples, unless stated otherwise, on moisture contents are weight % based on the total weight of the tissue.

Referring to FIG. 7, as shown in the graph, the modified starch, by itself, has better tackiness early on, i.e., at 50% to about 30% moisture content, which is an important area in the tack profile. However, the plots in this graph further show that if modified starch is used at one point and used 50:50 (by wt) with another adhesive at one point, a broad range of tackiness is obtained from 50% moisture content all the way until 20% moisture content. Essentially, this graph shows that the alkoxylated starch can be used by itself or a combination with a different wet strength resin to achieve control of the tackiness range that one desires or wants to "dial-in," which may be different based on the particular creping being done at each paper company.

Example 2

A separate study was conducted wherein a nonionic alkoxylated starch was used in combination with the regular wet strength resin (PAAE) to provide an adhesive formulation. The resulting formulation was tested in the laboratory for performance as a Yankee coating adhesive.

The adhesive formulation (2.5 wt % solids content) was prepared which contained a nonionic alkoxylated starch ("XP13-2216 JTA") combined in 50:50 wt:wt blends with a regular wet strength resin (PAAE), in an aqueous dispersion. As a control, the regular wet strength resin was used alone in a separate formulation at 2.5 wt % solids content. A high solid content, high temperature resistance and high tack nonionic alkoxylated starch was used in these formulations. The nonionic alkoxylated starch was a modified starch obtained commercially as an aqueous modified carbohydrate dispersion under the product name PENLAM-HT® from Penford Products Co. (38% solids, 1500 cps, pH=5.0-7.0, density 1.2, pourable liquid form). The regular wet strength resin (PAAE) resin used in this formulation and control was the same type of resin ("WSR") used in Example 1. The component or components in each formulation were diluted in deionized water to obtain a solids content (actives content) of 2.5 wt %, and a water content of 97.5 wt %. In the formulations combining the nonionic alkoxylated starch and the regular wet strength resin (PAAE), the different adhesives were combined at a 50:50 (by wt) mixing ratio such that each adhesive was contained in the dilute formulation in an amount of 1.25 wt %, in combination with 97.5 wt % water.

Laboratory experiments were performed on the formulations in order to evaluate their tack profiles as a function of tissue moisture content. The test used to measure coating film tackiness as a function of web moisture content for each formulation was the same as that indicated for Example 1. The results of the tack test measurements for the formulations are shown in FIG. 8. Referring to FIG. 8, a graph of tack as a function of the moisture content of the tissue is shown for the formulation that comprises the regular wet strength resin PAAE alone [♦], which was diluted down to 2.5 wt % solids content and, in another graph, the tack as a function of time for a coating that comprises the regular PAAE combined with the indicated non-ionic alkoxylated starch at a 50:50 wt % mixing ratio [■], which was diluted down to 2.5 wt % solids content. As shown in the graphs in FIG. 8, when the regular PAAE resin alone is used, the tackiness is very low and almost uniformly the same from 50% tissue moisture content all the way to 0% tissue moisture content. The tackiness is low, but the tackiness actually is somewhat undesirable as the paper dries, so when the moisture content starts getting into the 5% tissue moisture content range, tackiness is not wanted, and yet this PAAE, when used alone, keeps its tackiness, which is undesirable or at least considered a disadvantage. Comparing that to the coating that represents an example of the present invention with the 50:50 (by wt) mix of WSR and the non-ionic alkoxylated starch, and a very nice tackiness range can be seen starting at 40% tissue moisture content and continuing until 5% tissue moisture content. This graph in FIG. 8 actually shows the significant contributions that the alkoxylated starch can make when used in combination with an adhesive resin, such as PAAE.

Example 3

A separate study was run wherein the performance of additional formulations containing the nonionic alkoxylated starch itself and in a mixture with a modified PAAE resin were studied for performance as Yankee coatings and/or TAD Yankee coatings using laboratory evaluation and trials run on a paper machine.

In this study, an adhesive formulation was prepared which contained the nonionic alkoxylated starch ("XP13-2216 JTA") as the sole adhesive (2.5 wt % solids content), and another formulation was prepared which combined the non-ionic alkoxylated starch in a 50:50 wt:wt blend with BUBOND® 2620 ("2620") (2.8% solids content). As a control, the BUBOND® 2620 was used alone in a separate formulation at 2.5 wt % solids content. These formulations were prepared as aqueous dispersions.

Laboratory experiments were performed on the formulations in order to evaluate their tack profiles as a function of tissue moisture content. The test used to measure coating film tackiness as a function of web moisture content for each formulation was the same as that indicated for Example 1. The results of the tack test measurements for the formulations are shown in FIG. 9. Referring to FIG. 9, as can be seen from the graphs, excellent adhesiveness is obtained for the combination starting at 50% tissue moisture content and ending around 20% tissue moisture content. With respect to the other two tested formulations, the alkoxylated starch alone has high tackiness which drops off quickly, or in the case of the control, the tackiness actually gets tacky at the wrong time, i.e., at lower moisture contents. These results show that the inclusion of the nonionic alkoxylated starch as an additive for a formulation containing the modified PAAE can improve the wet (initial) tack thereof.

A trial on an industrial scale paper machine was conducted for the formulation comprising the cationic alkoxylated starch and regular wet strength resin (WSR) in the 50:50 wt:wt mixture (2.5 wt % solids content) was performed which included a Yankee arrangement, such as generally as shown in FIGS. 2 and 5. The performance on the paper machine was observed. Prior to the trial, when using a regular wet strength resin (WSR) alone, the tissue machine had a frequently broke web problem because of high moisture content and uneven moisture profile of the wet web. When using the cationic alkoxylated starch alone or in combination with the indicated different adhesive chemistry (e.g., modified-PAAE), the tissue machine runability was improved dramatically.

Example 4

A separate study was run wherein the wet tack performance of the nonionic alkoxylated starch itself was measured and compared to that of a conventional polyvinyl alcohol used as a TAD Yankee coating. Table 1 shows the results for these measurements. The "wet tack" property was determined as in Example 1 using the simulated roller test, which is known as a tackiness tester.

TABLE 1

| Chemistry | Wet Tack (g) |
| --- | --- |
| XP13-2216JTA | 512 |
| PVOH (commercially used) | 147 |
| Ideal Tack PVOH | 573 |

These results show that the nonionic alkoxylated starch ("XP13-2216JTA"), which is a modified starch by itself, has excellent tackiness at 512 grams. The PVOH from commercial usage, which is considered representative of the conventional commonly-used PVOH since its molecular weight is easier to work with because paper machine operators have to take the PVOH and receive it as a solid and then they make the solution at the paper mill. If the molecular weight of the PVOH is too high, then it becomes extremely difficult to handle and to make into solution. Thus, the reference to "Ideal Tack PVOH" in Table 1 is actually a higher molecular weight PVOH, which has excellent tack, but due to its molecular weight, it is extremely difficult to work with. Generally, many paper companies do not use it due to this disadvantage. So, while it has excellent wet tack, it is very hard to form solutions with it. In view of this, use of the lower molecular weight PVOH, which has lower tack, may be more practical. The results shown in this table shows that the wet tack for the alkoxylated starch is almost as good as the Ideal Tack PVOH, and, yet, it is already water-soluble and can be used in aqueous solution so it is not difficult to handle and there is no need for converting it from solid to liquid before use.

The present invention includes the following aspects/embodiments/features in any order and/or in any combination:

1. An adhesive formulation comprising:
   a) at least one alkoxylated starch;
   b) at least one of
      i) at least one resin,
      ii) at least one release aid,
      iii) at least one modifier, and optionally
   c) water, wherein said resin is different from a).
2. The adhesive formulation of any preceding or following embodiment/feature/aspect, wherein said alkoxylated starch is a non-ionic alkoxylated starch in aqueous soluble/dispersible liquid form.
3. The adhesive formulation of any preceding or following embodiment/feature/aspect, wherein said alkoxylated starch is a C1-C10 alkoxylated starch.
4. The adhesive formulation of any preceding or following embodiment/feature/aspect, wherein said alkoxylated starch is ethoxylated starch, propoxylated starch, or any combinations thereof.
5. The adhesive formulation of any preceding or following embodiment/feature/aspect, wherein said alkoxylated starch is present in an amount of from 30 wt % to 60 wt %, said resin is present in an amount of from 60 wt % to 0 wt %, said release aid is present in an amount of from 0 wt % to about 25 wt %, said modifier is present in an amount of from 0 wt % to about 25 wt %, and said water is present in an amount of from 0 wt % to 69 wt %, wherein said weight percents are based on the total weight percent of the formulation.
6. The adhesive formulation of any preceding or following embodiment/feature/aspect, wherein said resin, said release aid, said modifier, and said water are present.
7. The adhesive formulation of any preceding or following embodiment/feature/aspect, wherein the starch of said alkoxylated starch is waxy maize starch, dent corn starch, tapioca starch, potato starch, or any combinations thereof.
8. The adhesive formulation of any preceding or following embodiment/feature/aspect, wherein the resin is present and is at least one of polyvinyl alcohol, polyamide epichlorohydrin polymer (PAE), poly(amidoamine) epichlorohydrin polymer (PAAE), or any combinations thereof.
9. The adhesive formulation of any preceding or following embodiment/feature/aspect, wherein said alkoxylated starch and said resin are present in a ratio of 1:10 to 10:1, on a weight/weight basis.
10. The adhesive formulation of any preceding or following embodiment/feature/aspect, wherein said release aid is present and comprises an oil-based formulation comprising at least one vegetable oil, at least one lecithin, at least one dispersant/emulsifier, and optionally water, and said modifier is present and comprises glycerine.
11. A process for creping a fiber web, comprising:
   providing a rotating cylindrical dryer, including a dryer surface,
   applying a formulation comprising the formulation of claim 1 to the dryer surface,
   conveying a fiber web to the dryer surface,
   drying the fiber web on said dryer surface to form a dried fiber web, and
   creping the dried fiber web from the dryer surface.
12. The process of any preceding or following embodiment/feature/aspect, wherein coating film tack of the formulation increases by at least 1.5 times (1.5×) when moisture content of said fiber web decreases from about 50 wt % to about 30 wt % during said drying of said fiber web on said dryer surface, and then decreases by at least 1.5 times (1.5×) when moisture content of said fiber web decreases from about 30 wt % to about 10 wt % during said drying of said fiber web on said dryer surface.
13. The process of any preceding or following embodiment/feature/aspect, wherein alkoxylated starch, resin, release aid, modifier, and water are present in said formulation.
14. The process of any preceding or following embodiment/feature/aspect, wherein said formulation has 0.5 wt % to 10 wt % total solids content, and water is present in the formulation in an amount of from 99.5 wt % to 90 wt %.
15. The process of any preceding or following embodiment/feature/aspect, wherein said formulation comprises 0.5 wt % to 10 wt % alkoxylated starch, and water is present in the formulation in an amount of from 99.5 wt % to 90 wt %.
16. The process of any preceding or following embodiment/feature/aspect, wherein the formulation comprises alkoxylated starch that is a C1-C10 alkoxylated starch.
17. The process of any preceding or following embodiment/feature/aspect, wherein the formulation comprises alkoxylated starch and a resin that is at least one of polyvinyl alcohol, polyamide epichlorohydrin polymer (PAE), poly(amidoamine) epichlorohydrin polymer (PAAE), or any combinations thereof.
18. The process of any preceding or following embodiment/feature/aspect claim 17, wherein said alkoxylated starch and said resin are present in said formulation in a ratio of 1:10 to 10:1, on a weight/weight basis.
19. The process of any preceding or following embodiment/feature/aspect, wherein the formulation is in the absence of polyvinyl alcohol.
20. The process of any preceding or following embodiment/feature/aspect, further comprising predrying the fiber web using through-air drying before the fiber web is transferred to the dryer surface using a structured fabric to convey the web to the dryer surface, wherein at least one of the structured fabric and the dryer surface is precoated with the adhesive formulation before contacted with the fiber web.
21. The process of any preceding or following embodiment/feature/aspect, wherein said fiber web comprises pulp obtained from recycled paper.
22. The process of any preceding or following embodiment/feature/aspect, wherein said formulation is applied in an amount of from about 0.5 mg/m$^2$ of dryer surface to 40 mg/m$^2$ of dryer surface.
23. A process of making a creped fiber web, comprising:
   applying a formulation comprising the formulation of claim 1 to a TAD fabric to provide a coated surface, wherein the TAD fabric is arranged in an endless loop such that the TAD fabric passes around a foraminous dryer roll of a through-air dryer (TAD),
   transferring a fiber web to the coated surface of the TAD fabric;
   conveying the coated TAD fabric with the fiber web carried thereon around the dryer roll with passing of heated air through the fiber web to provide a dried web without drying of the fiber web on a Yankee dryer, and
   separating the dried web from the TAD fabric for collection of the dried web, wherein the dried web comprises at least one creped property.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An adhesive formulation comprising:
   a) at least one alkoxylated starch;
   b)
      i) at least one resin,
      ii) at least one release aid, and
      iii) at least one modifier, and
   c) water,
   wherein:
   said resin is different from a) and said resin is present and is at least one of polyamide epichlorohydrin polymer (PAE), poly(amidoamine) epichlorohydrin polymer (PARE), or any combinations thereof; and
   the adhesive formulation is capable of being sprayed through a Yankee dryer spray nozzle.

2. The formulation of claim 1, wherein said alkoxylated starch is a non-ionic alkoxylated starch in aqueous soluble/dispersible liquid form.

3. The formulation of claim 1, wherein said alkoxylated starch is a C1-C10 alkoxylated starch.

4. The formulation of claim 1, wherein said alkoxylated starch is ethoxylated starch, propoxylated starch, or any combinations thereof.

5. The formulation of claim 1, wherein said alkoxylated starch is present in an amount of from 30 wt % to 60 wt %, said resin is present in an amount of from 50 wt % to 1 wt %, said release aid is present in an amount of from 1 wt % to about 20 wt %, said modifier is present in an amount of from 1 wt % to about 20 wt %, and said water is present in an amount of from 1 wt % to 69 wt %, wherein said weight percents are based on the total weight percent of the formulation.

6. The formulation of claim 1, wherein the starch of said alkoxylated starch is waxy maize starch, dent corn starch, tapioca starch, potato starch, or any combinations thereof.

7. The formulation of claim 1, wherein said alkoxylated starch and said resin are present in a ratio of 1:10 to 10:1, on a weight/weight basis.

8. The formulation of claim 1, wherein said release aid comprises an oil-based formulation comprising at least one vegetable oil, at least one lecithin, at least one dispersant/emulsifier, and said modifier comprises glycerine.

9. A process for creping a fiber web, comprising:
   providing a rotating cylindrical dryer, including a dryer surface,
   applying a formulation comprising the formulation of claim 1 to the dryer surface,
   conveying a fiber web to the dryer surface,
   drying the fiber web on said dryer surface to form a dried fiber web, and
   creping the dried fiber web from the dryer surface.

10. The process of claim 9, wherein coating film tack of the formulation increases by at least 1.5 times (1.5×) when moisture content of said fiber web decreases from about 50 wt % to about 30 wt % during said drying of said fiber web on said dryer surface, and then decreases by at least 1.5 times (1.5×) when moisture content of said fiber web decreases from about 30 wt % to about 10 wt % during said drying of said fiber web on said dryer surface.

11. The process of claim 9, wherein said formulation has 0.5 wt % to 10 wt % total solids content, and water is present in the formulation in an amount of from 99.5 wt % to 90 wt %.

12. The process of claim 9, wherein said formulation comprises 0.5 wt % to 10 wt % alkoxylated starch, and water is present in the formulation in an amount of from 98 wt % to 97 wt %.

13. The process of claim 9, wherein the formulation comprises alkoxylated starch that is a C1-C10 alkoxylated starch.

14. The process of claim 9, wherein said alkoxylated starch and said resin are present in said formulation in a ratio of 1:10 to 10:1, on a weight/weight basis.

15. The process of claim 9, wherein the formulation is in the absence of polyvinyl alcohol.

16. The process of claim 9, further comprising predrying the fiber web using through-air drying before the fiber web is transferred to the dryer surface using a structured fabric to convey the web to the dryer surface, wherein at least one of the structured fabric and the dryer surface is precoated with the adhesive formulation before contacted with the fiber web.

17. The process of claim 9, wherein said fiber web comprises pulp obtained from recycled paper.

18. The process of claim 9, wherein said formulation is applied in an amount of from about 0.5 mg/m² of dryer surface to 40 mg/m² of dryer surface.

19. A process of making a creped fiber web, comprising:
   applying a formulation comprising the formulation of claim 1 to a TAD fabric to provide a coated surface, wherein the TAD fabric is arranged in an endless loop such that the TAD fabric passes around a foraminous dryer roll of a through-air dryer (TAD),
   transferring a fiber web to the coated surface of the TAD fabric;
   conveying the coated TAD fabric with the fiber web carried thereon around the dryer roll with passing of heated air through the fiber web to provide a dried web without drying of the fiber web on a Yankee dryer, and
   separating the dried web from the TAD fabric for collection of the dried web, wherein the dried web comprises at least one creped property.

* * * * *